US012755165B2

(12) United States Patent
Murugappan et al.

(10) Patent No.: US 12,755,165 B2
(45) Date of Patent: Oct. 6, 2026

(54) SYSTEMS AND METHODS FOR PROVIDING A DIGITAL HUMAN IN A VIRTUAL ENVIRONMENT

(71) Applicant: ACCENTURE GLOBAL SOLUTIONS LIMITED, Dublin (IE)

(72) Inventors: Chellappan Murugappan, Chennai (IN); Raghvendra Kotalwar, Pimple Saudagar (IN); Bolaka Mukherjee, Howrah (IN); Ankur Tandon, Ghaziabad (IN); Amit Misra, Uttar Pradesh (IN); Ashwin Joseph D Silva, Mumbai (IN); Ashok Vira, Mumbai (IN); Anandu Koikkalethu Balachandran, Pathanamthitta (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 755 days.

(21) Appl. No.: 18/124,267

(22) Filed: Mar. 21, 2023

(65) Prior Publication Data

US 2024/0320519 A1 Sep. 26, 2024

(51) Int. Cl.
*G06N 5/022* (2023.01)
*G06F 16/2457* (2019.01)

(52) U.S. Cl.
CPC ....... *G06N 5/022* (2013.01); *G06F 16/24575* (2019.01)

(58) Field of Classification Search
CPC .......... G06N 5/22; G06N 3/044; G06N 3/045; G06N 3/08; G06F 16/24575
See application file for complete search history.

(56) References Cited

U.S. PATENT DOCUMENTS 8,032,507 B1 * 10/2011 Bayardo ............. G06F 16/3347 707/706
8,285,654 B2 * 10/2012 Bajrach ................ G11B 27/105 706/14

(Continued)

FOREIGN PATENT DOCUMENTS

CN 113190593 A * 7/2021 ........... G06F 16/288

OTHER PUBLICATIONS

Zhao, Sicheng, et al, "Emotion Recognition from Multiple Modalities: Fundamentals and Methodologies", IEEE Signal Processing Magazine, vol. 32, Issue 6, Nov. 1, 2021, pp. 59-73. (Year: 2021).*

(Continued)

*Primary Examiner* — Kieu D Vu
(74) *Attorney, Agent, or Firm* — Mannava & Kang, P.C.

(57) ABSTRACT

Systems and methods for providing a digital human in a virtual space are disclosed herein. A system receives, from a user via a digital platform, a selection of a persona, for a digital human, from a plurality of personas. Further, the system receives, in real-time, an input from the user via the digital platform, and identifies a set of parameters associated with the input. Furthermore, the system determines, from a knowledge database, a response information based on the context of the input, and generates, using a repository, a set of attributes for the response information based at least on the set of parameters associated with the input and the persona selected by the user. Additionally, the system aggregates the set of attributes and the response information to generate a personalized response to the input, and renders the personalized response by the digital human on the digital platform.

20 Claims, 15 Drawing Sheets

(56) References Cited

U.S. PATENT DOCUMENTS

| | | | | |
|---|---|---|---|---|
| 10,943,172 | B1 * | 3/2021 | Tappin | G06N 5/022 |
| 12,282,606 | B2 * | 4/2025 | Divakaran | G06V 40/16 |
| 12,373,690 | B2 * | 7/2025 | Woods, Jr. | G06N 3/0499 |
| 2016/0275594 | A1 * | 9/2016 | Mullakkara Azhuvath | G06F 16/248 |
| 2017/0185920 | A1 * | 6/2017 | Chawla | G06N 5/04 |
| 2019/0095775 | A1 * | 3/2019 | Lembersky | G06N 3/006 |
| 2019/0324990 | A1 * | 10/2019 | Faith | H04W 4/025 |
| 2020/0098366 | A1 * | 3/2020 | Chakraborty | G10L 15/22 |
| 2021/0089822 | A1 * | 3/2021 | Baek | G06V 10/82 |
| 2021/0249035 | A1 * | 8/2021 | Bone | G10L 25/63 |
| 2021/0407504 | A1 * | 12/2021 | Colleen | G06N 5/02 |
| 2023/0118412 | A1 * | 4/2023 | Gao | G10L 15/22 704/231 |
| 2023/0282201 | A1 * | 9/2023 | Bissell | G10L 13/086 704/270 |
| 2024/0046932 | A1 * | 2/2024 | Opp | G10L 15/005 |

OTHER PUBLICATIONS

Intellectual Property India, "First Examination Report App. No. 202414001372", dated Aug. 26, 2025, 10 pages.

* cited by examiner

SYSTEMS AND METHODS FOR PROVIDING A DIGITAL HUMAN IN A VIRTUAL ENVIRONMENT

BACKGROUND

The notion of advanced machines with human-like intelligence is well known. Artificial Intelligence (AI) is intelligence exhibited by machines, where the machine perceives its environment and takes actions that maximize its chance of success at some goal. Traditional problems of AI research include reasoning, knowledge, planning, learning, natural language processing, perception, and the ability to move and manipulate objects, while examples of capabilities generally classified as AI include successfully understanding human speech, or the like.

Natural language processing, in particular, gives machines the ability to read and understand human language, such as for machine translation and question answering. However, the ability to recognize speech as well as humans is a continuing challenge, because human speech, especially during spontaneous conversation, may be complex. Furthermore, though AI has become more prevalent and more intelligent over time, the interaction with AI devices still remains characteristically robotic, impersonal, and emotionally detached. Additionally, virtual agent and automated attendant systems typically do not include flexibility to provide different personality styles.

Therefore, there is a need to provide systems and methods that may make interactions and/or conversations with a machine more human-like.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system including a processor, and a memory coupled to the processor. The memory may include processor-executable instructions, which on execution, cause the processor to receive, from a user interacting with the system via a digital platform, a selection of a persona, for a digital human, from a plurality of personas, receive, in real-time, an input from the user via the digital platform, and identify a set of parameters associated with the input. The set of parameters may include at least a context of the input, a level of emotion, and one or more safety constraints. Further, the processor may determine, from a knowledge database, a response information based on the context of the input, and generate, using a repository, a set of attributes for the response information based at least on the set of parameters associated with the input and the persona selected by the user. The set of attributes correspond to at least an audio attribute and a visual attribute. Furthermore, the processor may aggregate the set of attributes and the response information to generate a personalized response to the input, and render the personalized response by the digital human on the digital platform.

In an example embodiment, the processor may determine the response information from the knowledge database by generating embeddings associated with the input, selecting embeddings from the knowledge database based on the generated embeddings associated with the input, and determining a similarity parameter based on a comparison of the generated embeddings and the selected embeddings.

In an example embodiment, the processor may determine the response information by determining whether the similarity parameter is greater than a predefined threshold, in response to a positive determination, determining the response information from the knowledge database using a fine tuning neural network machine learning model, and in response to a negative determination, determining the response information from the knowledge database using a neural network machine learning model.

In an example embodiment, the embeddings correspond to at least one of a transcript, a tone, a language, an accent, and an emotion associated with the input.

In an example embodiment, the similarity parameter corresponds to a semantic relevance of the context and the input based on the selected embeddings.

In an example embodiment, the processor may generate the set of attributes by accessing a persona profile associated with the selected persona from the repository, and retrieving information corresponding to the set of attributes from the repository based on the persona profile.

In an example embodiment, the repository may include a first repository and a second repository. The processor may retrieve the information corresponding to the audio attribute from the first repository and the visual attribute from the second repository based on the persona profile.

In an example embodiment, the information corresponding to the audio attribute may include at least one of voice tone features, emotion features, accent features, and language features. In an example embodiment, the information corresponding to the video attribute may include at least one of facial expressions, gestures, volumetric data, and body movements.

In an example embodiment, the processor may validate the personalized response to determine if a correct set of attributes are shared in the personalized response, and modify the set of attributes in the repository based on the validation.

In an example embodiment, the processor may record behavior of the user reading a pre-defined script in a controlled environment, capture information with respect to visual data and audio data of the user based on the recorded behavior, determine the plurality of personas based on tagging the information with a respective persona, and store the plurality of personas in the repository.

In an example embodiment, the processor may capture the information with respect to the visual data by performing at least one of volumetric data capture, coordinate tagging, data persistence, and movement validation with respect to the user.

In an example embodiment, the processor may convert the audio data into embeddings, where the embeddings may be stored in the repository. In an example embodiment, the processor may convert the audio data into the embeddings using a multi-task model, where the multi-task model may include at least one of conversion of speech to text, tone detection, language detection, accent detection, and emotion detection.

In an example embodiment, the digital platform may be one of a messaging service, an application, or an artificial intelligent user assistance platform. In an example embodiment, the digital platform may be at least one of a text, a voice, and a video message service.

In an aspect, the present disclosure relates to a method including receiving, by a processor, from a user interacting with a system via a digital platform, a selection of a persona, for a digital human, from a plurality of personas, receiving, by the processor, in real-time, an input from the user via the digital platform, and identifying, by the processor, a set of parameters associated with the input. The set of parameters may include at least a context of the input. Further, the method may include determining, by the processor from a knowledge database, a response information based on the context of the input, and generating, by the processor using a repository, a set of attributes for the response information based at least on the set of parameters associated with the input and the persona selected by the user. The set of attributes correspond to at least an audio attribute and a visual attribute. Furthermore, the method may include aggregating, by the processor, the set of attributes and the response information to generate a personalized response to the input, and render, by the processor, the personalized response through the digital human on the digital platform.

In an example embodiment, the method may include accessing, by the processor, a persona profile associated with the selected persona from the repository, and retrieving, by the processor, information corresponding to the set of attributes from the repository based on the persona profile.

In an example embodiment, the method may include retrieving, by the processor, the information corresponding to the audio attribute from a first repository and the visual attribute from a second repository based on the persona profile.

In an aspect, the present disclosure relates to a method a non-transitory computer-readable medium including machine-readable instructions that are executable by a processor to receive, from a user via a digital platform, a selection of a persona, for a digital human, from a plurality of personas, receive, in real-time, an input from the user via the digital platform, and identify a set of parameters associated with the input, where the set of parameters include at least a context of the input. Further, the processor may be to determine, from a knowledge database, a response information based on the context of the input, generate, using a repository, a set of attributes for the response information based at least on the set of parameters associated with the input and the persona selected by the user, where the set of attributes correspond to at least an audio attribute and a visual attribute. Furthermore, the processor may be to aggregate the set of attributes and the response information to generate a personalized response to the input, and render the personalized response by the digital human on the digital platform.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
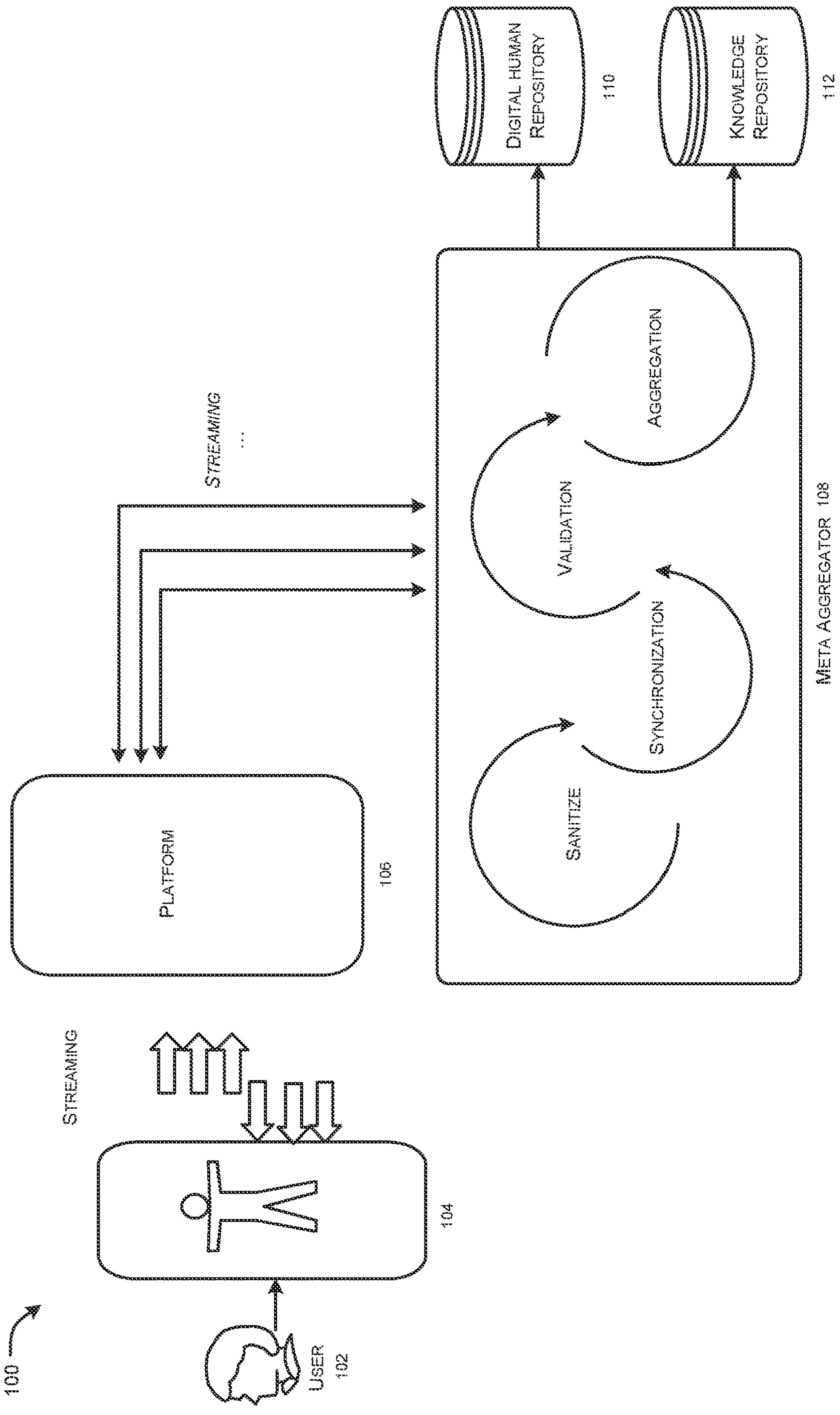
FIG. 1 illustrates an example operating representation for implementing a system for providing a digital human in a virtual environment, in accordance with embodiments of the present disclosure.

The foregoing shall be more apparent from the following more detailed description of the disclosure.

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word “exemplary” and/or “demonstrative” is used herein to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent exemplary structures and techniques known to those of ordinary skill in the art. Furthermore, to the extent that the terms “includes,” “has,” “contains,” and other similar words are used in either the detailed description or the claims, such terms are intended to be inclusive—in a manner similar to the term “comprising” as an open transition word—without precluding any additional or other elements.

Reference throughout this specification to “one embodiment” or “an embodiment” or “an instance” or “one instance” means that a particular feature, structure, or characteristic described in connection with the embodiment is included in at least one embodiment of the present invention. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising.” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

The present disclosure relates to systems and methods for building a human-like conversational experience by combining the power of artificial intelligence (AI) and volumetric capture. Further, the present disclosure is supported by neural network machine learning algorithms in augmented reality (AR) and/or virtual reality (VR) space.

Certain advantages and benefits are provided and/or facilitated by the present disclosure. For example, the disclosed system provides personalized and humanized experience for end users. The disclosed system is powered by intelligence, for example, artificial intelligence, cognitive services, or the like. The disclose system may be completely customizable across different industry use cases including, but not limited to, human resources (HR), banking, finance, sales, customer support, or the like. Further, the disclosed system supports different sentiments based on response types such as, positive, negative, neutral, etc.

In particular, the present disclosure describes a system for facilitating communication between a user and a digital character (human) in a virtual environment. As an initial step, the system may undergo a training phase, where the system may capture audio and video samples corresponding to various users. Thereafter, the system may enable real time rendering of the digital human based on the captured audio and video samples.

In the training phase, the system may record a behavior of a user reading a pre-defined script in a controlled environment. For example, the controlled environment may include artificial intelligence (AI) cameras and sensors (but not limited to the like) to record the behavior of the user. Further, the system may capture information with respect to visual data and audio data of the user based on the recorded behavior. In an example embodiment, the system may capture the information with respect to the visual data by performing at least one of volumetric data capture, coordinate tagging, data persistence, and movement validation with respect to the user. In another example embodiment, the system may convert the audio data into embeddings, for example, by performing at least one of conversation of speech to text, tone detection, language detection, accent detection, and emotion detection. In an example embodiment, the system may determine a plurality of personas based on tagging the information with a respective persona, and the system may store the plurality of personas in a repository.

In an example embodiment, the system may receive a selection of a persona from a plurality of personas for the digital human. For example, the system may receive the selection of the persona from a user interacting with the system via a digital platform. It may be understood that the plurality of personas correspond to attributes of different users using which the system is trained during the training phase. In an example embodiment, the digital platform may be one of a messaging service, an application, or an AI user assistance platform. In another example embodiment, the digital platform may be an augmented reality (AR) platform or a virtual reality (VR) platform.

Further, the system may receive an input from the user via the digital platform. For example, the user may initiate a conversation with the digital human via the digital platform. In an example embodiment, the system may identify a set of parameters associated with the input from the user. The set of parameters may include at least a context of the input. In another example embodiment, the set of parameters may include at least a level of emotion associated with the input from the user, and one or more safety constraints. For example, the system may identify parameters corresponding to safety constraints such as, but not limited to, negative actions/words, and the like.

Furthermore, the system may determine a response information from a knowledge base based on the context of the input. The response information may be in the form of textual information. In an example embodiment, the system may generate embeddings associated with the input. For example, the embeddings may correspond to at least one of a transcript, a tone, a language, an accent, and an emotion associated with the input. The system may then select embeddings from the knowledge base based on the generated embeddings associated with the input. Further, the system may generate a similarity parameter based on a comparison of the generated embeddings and the selected embeddings. For example, the similarity parameter may correspond to a semantic relevance of the context and the input based on the selected embeddings. In an example embodiment, the system may determine whether the similarity parameter is greater than a predefined threshold. In response to a positive determination, the system may determine the response information from the knowledge base using a fine tuning neural network machine learning model. In response to a negative determination, the system may determine the response information from the knowledge base using a neural network machine learning model.

The system may then generate a set of attributes for the response information using a repository. In an example embodiment, the system may generate the set of attributes based at least on the set of parameters associated with the input and the persona selected by the user. The set of attributes may correspond to at least an audio attribute and a visual attribute corresponding to the persona selected by the user. In an example embodiment, the system may access a persona profile associated with the selected persona from the repository. Further, the system may retrieve information corresponding to the set of attributes from the repository based on the persona profile. In an example embodiment, the repository may include a first repository and a second repository. The system may retrieve information corresponding to the audio attribute from the first repository, and the system may retrieve information corresponding to the visual attribute from the second repository based on the persona profile. In an example embodiment, the information corresponding to the audio attribute may include at least one of voice tone features, emotion features, accent features, and language features. In another example embodiment, the information corresponding to the visual attribute may include at least one facial expressions, gestures, volumetric data, and body movements.

In an example embodiment, the system may aggregate the set of attributes (for example, the audio attribute and the visual attribute) and the response information (for example, the textual information) to generate a personalized response to the input. For example, based on the persona selected by the user, the system may generate the personalized response to the input. Further, the system may render the personalized response by the digital human on the digital platform.

The system may also validate the personalized response to determine if a correct set of attributes are shared in the personalized response. In response to a determination that the correct set of attributes are not shared in the personalized response, the system may modify the set of attributes in the repository based on the validation.

Therefore, the present disclosure describes a system for providing a human-like conversational experience to users by combining volumetric data and power of AI supported by Open AI neural network machine learning models in a digital platform.

The various embodiments throughout the disclosure will be explained in more detail with reference to FIGS. 1-15.

FIG. 1 illustrates an example operating representation for implementing a system 100 for providing a digital human in a virtual environment, in accordance with embodiments of the present disclosure.

In this example embodiment, the system 100 may include a platform 106, a meta aggregator 108, a digital human repository 110, and a knowledge repository 112. In an example embodiment, a user 102 may interact with the platform 106. For example, the platform 106 may be a digital platform operating in an augmented reality (AR) or virtual reality (VR) environment, but not limited to the like. In an example embodiment, the user 102 may initiate the interaction with the platform 106 by sending an input. For example, the user 102 may post a query or initiate a conversation with the platform 106 using a computing device (not shown). In an example embodiment, the computing device may refer to a wireless device and/or a user equipment (UE). It should be understood that the terms "computing device," "wireless device," and "user equipment (UE)" may be used interchangeably throughout the disclosure.

A wireless device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an example embodiment, the computing device may communicate with the platform 106 via a set of executable instructions residing on any operating system. In an example embodiment, the computing device may include, but are not limited to, any electrical, electronic, electromechanical or an equipment or a combination of one or more of the above devices such as VR devices, AR devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from the user 102 such as touch pad, touch enabled screen, electronic pen and the like.

A person of ordinary skill in the art will appreciate that the computing device may not be restricted to the mentioned devices and various other devices may be used by the user 102 for interacting with the platform 106.

Referring to FIG. 1, the platform 106 may communicate with the meta aggregator 108 based on the input received from the user 102. For example, the meta aggregator 108 may identify a set of parameters associated with the input. In an example embodiment, the meta aggregator 108 may identify at least one of a context, a level of emotion, and safety constraints associated with the input received from the user 102.

The meta aggregator 108 may utilize the digital human repository 110 and the knowledge repository 112 to determine a personalized response to be provided to the user 102. In an example embodiment, the meta aggregator 108 may determine a response information (for example, textual information) from the knowledge repository 112 based on the input received from the user 102. Further, the meta aggregator 108 may generate a set of attributes for the response information using the digital human repository 110. The meta aggregator 108 may generate the set of attributes based at least on the set of parameters associated with the input and a persona selected by the user 102. The set of attributes may correspond to at least an audio attribute and a visual attribute related to the selected persona.

In an example embodiment, the digital human repository 110 may include a first repository for audio attributes and a second repository for visual attributes corresponding to the selected persona. The audio attributes may include, but not be limited to, voice tone features, emotion features, and accent features. The visual attributes may include, but not be limited to, facial expressions, gestures, volumetric data, and body movements. The meta aggregator 108 may retrieve the audio attributes and the visual attributes corresponding to the set of parameters associated with the input and the persona selected by the user 102 from the digital human repository 110, i.e. the first repository and the second repository, respectively.

Referring to FIG. 1, the meta aggregator 108 may perform aggregation, validation, synchronization, and sanitization of the information received from the digital human repository 110 and the knowledge repository 112. In an example embodiment, the meta aggregator 108 may aggregate or combine the audio attributes and the visual attributes received from the digital human repository 110 (for example, the first and second repositories) with the response information received from the knowledge repository 112. Based on the aggregation, the meta aggregator 108 may generate a personalized response to the input. The meta aggregator 108 may then stream the personalized response on the platform 106 via a digital human 104. For example, the digital human 104 may respond with the personalized response based on the persona selected by the user 102. In an example embodiment, the set of attributes may correspond to expression, emotion, type of response, and the like. For example, the expression may be head nod or walk, the emotion may be agreement or natural, and the type of response may be played in loop, move back to standing position after execution. In such an example, the digital human 104 may respond with the personalized response (i.e., the determined set of attributes, i.e. head nod or walk; agreement or natural, etc.) to the user 102.

In an example embodiment, the meta aggregator 108 may validate if a correct set of attributes are shared in the personalized response. For example, the meta aggregator 108 may validate if the set of attributes such as, but not limited to, emotions, animation, tonality, language, and the like correspond to the set of parameters associated with the input received from the user 102 and the persona selected by the user 102. In response to a determination that the set of attributes shared in the personalized response are incorrect, the meta aggregator 108 may notify the platform 108 to bring the digital human 104 in a neutral position. Simultaneously, the meta aggregator 108 may synchronize and sanitize the set of attributes in the digital human repository 110. It may be understood that the meta aggregator 108 may perform these steps of aggregation, validation, synchronization, and sanitization for each response shared with the user 102 via the digital human 104 on the platform 106.

As an example, the user 102 may want to inquire about medical facilities available in an organization associated with the system 100, and post a query related to the same. In such an example, the platform 106 may provide personalized responses relevant to the user query (i.e., medical facilities in this case), in a manner which is explained in more detail throughout the disclosure. For example, the emotion, tone, language, gesture, and the like of the digital human 104 may be personalized based on the user query.

Although FIG. 1 shows exemplary components of the system 100, in other embodiments, the system 100 may include fewer components, different components, differently arranged components, or additional functional components than depicted in FIG. 1. Additionally, or alternatively, one or more components of the system 100 may perform functions described as being performed by one or more other components of the system 100.

Figure 2:
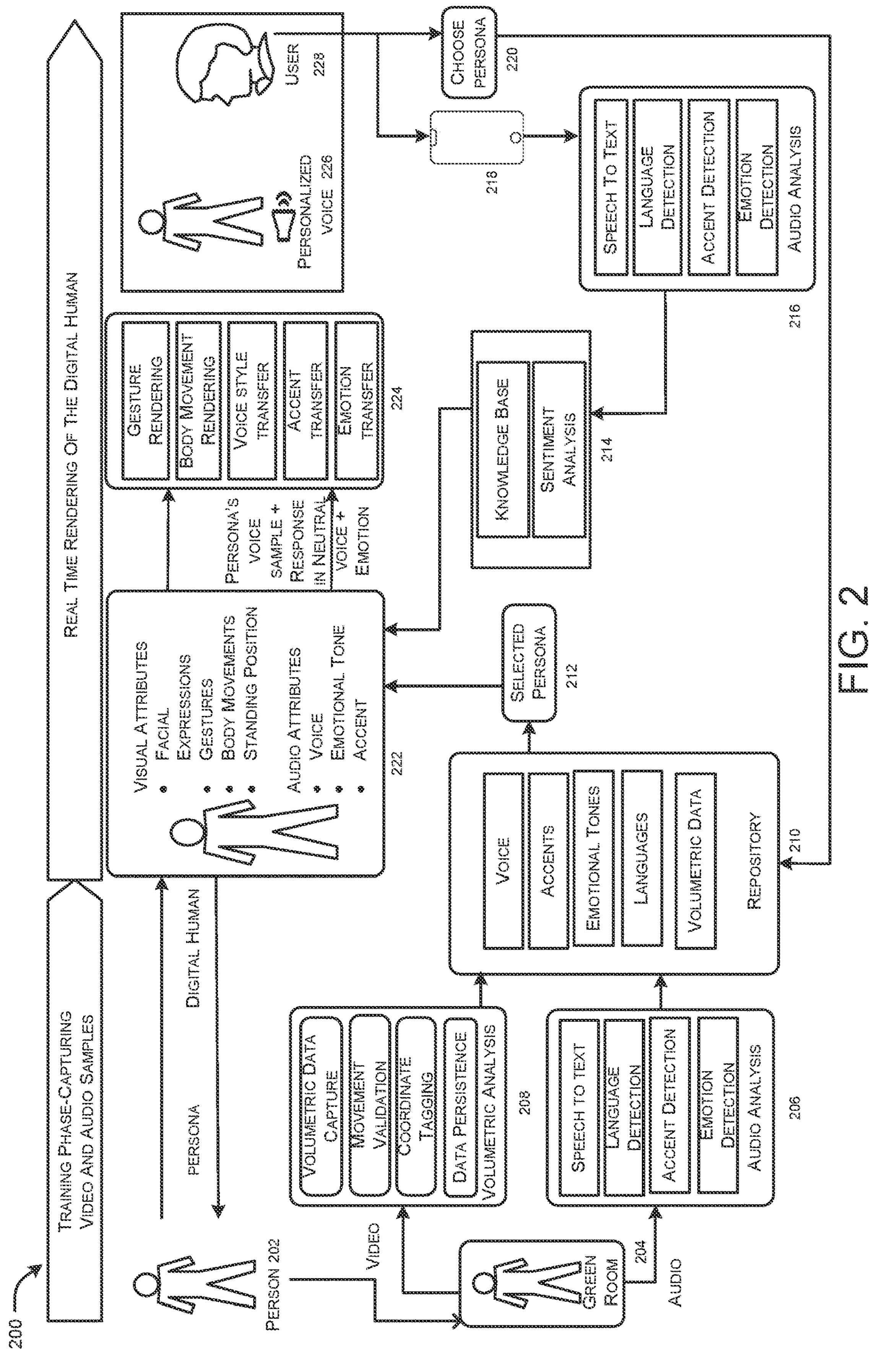
FIG. 2 illustrates an example operating architecture for representing a training phase and real time rendering of a digital human, in accordance with embodiments of the present disclosure.

FIG. 2 illustrates an example operating architecture 200 for representing a training phase and real time rendering of a digital human, in accordance with embodiments of the present disclosure.

In this example embodiment, the proposed system undergoes a training phase and real time rendering of the digital human. During the training phase, the system may capture audio and video samples of different users, for example person 202. In an example embodiment, the person 202 may read a pre-defined script in a controlled environment, for example, a green room 204. The green room 204 may include at least AI cameras and sensors to record a behavior of the person 202 while the person 202 reads the pre-defined script. For example, the person 202 may express different emotions, i.e., happy, surprised, sad, neutral, anger, fear, joy, or the like while reading the pre-defined script. In an example embodiment, the AI cameras and sensors may capture audio data and visual data of the person 202 such as, but not limited to, body gestures, emotions, language, and the like. The AI cameras and sensors may be placed in different angles in the green room 204 to capture every detail of the person 202.

In an example embodiment, the proposed system may perform audio analysis 206 of the audio data. The audio analysis 206 of the audio data may include, but not be limited to, speech to text conversion, language detection, accent detection, and emotion detection. In an example embodiment, the proposed system may convert the captured speech to text and detect the language, accent, tone, and emotion from the captured information corresponding to the person 202. It may be understood that the audio analysis 206 may be performed using one or more state-of-the-art models for automatic speech recognition based on a self-supervised training mechanism.

In an example embodiment, the proposed system may perform volumetric analysis 208 of the video data. The volumetric analysis 208 of the video data may include, but not be limited to, volumetric data capture, movement validation, coordinate tagging, and data persistence, which will be explained in more detail throughout the disclosure.

Referring to FIG. 2, all the information captured with respect to the audio data and the video data may be tagged and segregated into different personas. For example, the information captured with respect to the person 202 may be tagged as being specific to the persona of the person 202. These different personas may be stored as persona profiles in a repository 210 for use in real-time rendering of conversation between any user and the proposed system. A person of ordinary skill in the art may understand that the repository 210 may be similar to the digital human repository 110 of FIG. 1 in its functionality.

In an example embodiment, a persona profile may include, but not be limited to, voices, accents, emotional tones, languages, volumetric data, and the like, that is captured, processed, and analyzed in the training phase. The volumetric data may include, but not be limited to, videos of the person 202 in particular format such as, but not limited to, mp4 files, object files, or the like. Therefore, all the persona profiles stored in the repository 210 may undergo data sanitization, validation, synchronization, and training.

Referring to FIG. 2, when a user 228 starts interacting with the proposed system via a digital platform, as explained above with reference to FIG. 1, the user 228 may select a persona 220 from a plurality of personas stored in the repository 210. The user 228 may initiate interaction with the proposed system and/or select the persona 220 through a computing device 218. In an example embodiment, the user 228 may send an input via the digital platform through the computing device 218. The input may be in the form of, but not limited to, text, audio, and/or video.

In an example embodiment, the input received from the user 228 may undergo audio analysis 216. The audio analysis 216 may be similar to the audio analysis 206. As an example, based on the audio analysis 216, the proposed system may identify a set of parameters associated with the input received from the user 228. The set of parameters may include, but not be limited to, a context, a level of emotion, language, accent, and safety constraints.

Further, a knowledge repository 214 may use the set of parameters associated with the input to determine a response information for the input. For example, the knowledge repository 214 may perform sentiment analysis of the input to determine the context associated with the input and determine the response information stored in a knowledge base. A person of ordinary skill in the art may understand that the knowledge repository 214 may be similar to the knowledge repository 112 of FIG. 1 in its functionality. In an example embodiment, the knowledge repository 214 may implement a neural network machine learning model, such as, but not limited to Open AI Generative Pre-trained Transformer 3 (GPT3) to determine the response information. A person of ordinary skill in the art may understand that GPT3 may refer to an auto-regressive language model that uses deep learning to produce human-like text. In an example embodiment, the knowledge repository 214 may provide the response information to a meta aggregator 224.

Referring to FIG. 2, based on the selected persona 220, the repository 210 may generate a set of attributes 222 for the response information. The set of attributes 222 may correspond to an audio attribute and/or a visual attribute, for example, but not limited, voice, accent, emotional tone, language, facial expressions, gestures, body movements, body position, and the like of the selected persona 220. In an example embodiment, the repository 210 may provide the set of attributes 222 pertaining to the selected persona 212 to the meta aggregator 224.

The meta aggregator 224 may aggregate the set of attributes (i.e., the audio and visual attribute) and the response information (i.e., textual information) to generate a personalized response for the user 228. In an example embodiment, the meta aggregator 224 may provide the personalized response to a voice style transfer module of the meta aggregator 224. The personalized response may include, but not be limited to, persona's voice sample, response information in neutral voice, and emotion.

Referring to FIG. 2, the meta aggregator 224 may render the personalized response in an appropriate manner on the digital platform via the digital human 226. In an example embodiment, the meta aggregator 224 may perform, but not be limited to, gesture rendering, body movement rendering, voice style transfer, accent transfer, and emotion transfer based on the personalized response. Further, the digital human 226 may stream the personalized response on the digital platform to the user 228.

Although FIG. 2 shows exemplary components of the operating architecture 200, in other embodiments, the operating architecture 200 may include fewer components, different components, differently arranged components, or additional functional components than depicted in FIG. 2. Additionally, or alternatively, one or more components of the operating architecture 200 may perform functions described as being performed by one or more other components of the operating architecture 200.

Volumetric Analysis 208

Figure 3:
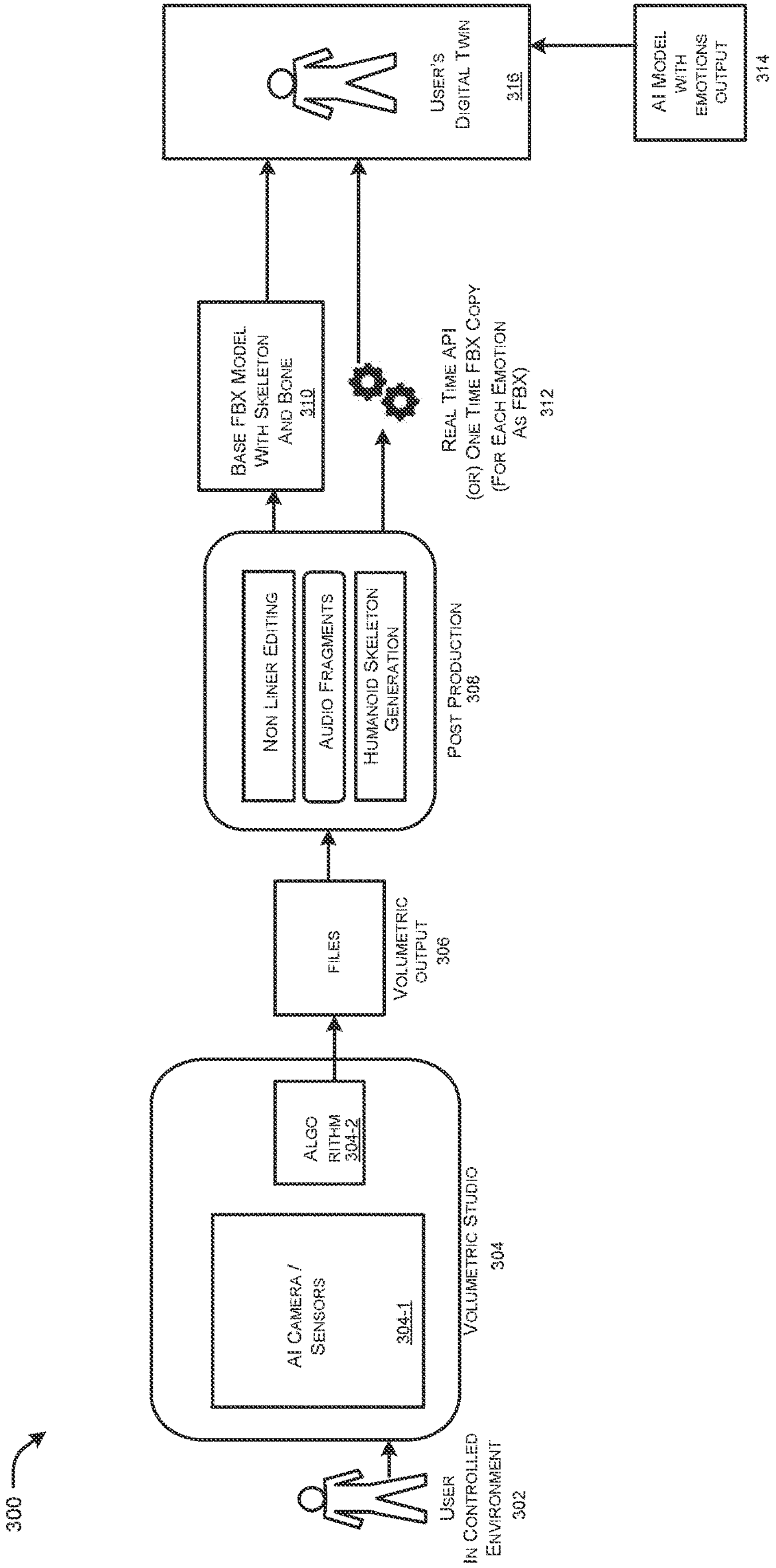
FIG. 3 illustrates an example flow diagram for implementing volumetric analysis in a training phase, in accordance with embodiments of the present disclosure.

FIG. 3 illustrates an example flow diagram of a method 300 for implementing volumetric analysis 208 in a training phase of the proposed system, in accordance with embodiments of the present disclosure.

Referring to FIG. 3, a user 302 enters a controlled environment 304 or a volumetric studio or a green room (for example, the green room 204 of FIG. 2). A person of ordinary skill in the art may understand that the user 302 may be similar to the person 202 of FIG. 2, and the volumetric studio 304 may be similar to the green room 204 of FIG. 2 in its functionality. In an example embodiment, the volumetric studio 304 may include, but not be limited to, AI cameras and sensors 304-1 to record a behaviour of the user 302. The AI camera and sensors 304-1 may be placed in different angles in the volumetric studio 304 to record the behavior of the user 302. In an example embodiment, the user 302 may read a pre-defined script in the volumetric studio 304. While reading the pre-defined script, the user 302 may come across different emotions, tones, languages, facial expressions, gestures, body movements, and the like. The AI camera and sensors 304-1 may capture all information pertaining to the behavior of the user 302. In an example embodiment, volumetric video(s) may be captured by uniformly placed AI cameras and sensors 304-1 around the user 302 and recording the target from all angles. Further, in an example embodiment, state-of-the-art algorithms 304-2 may be used to instantly review the captured information, enhance the data quality, and create lightweight, performant files as volumetric output 306. The files may be in a particular format such as, but not limited to, mp4, object, or the like. In an example embodiment, volumetric capture hardware and software kits may be utilized for recording the behavior and capturing information in the volumetric studio. The volumetric capture hardware and software kits may bring the real-world user 302 into interactive three-dimensional (3D) environments.

Referring to FIG. 3, the volumetric output 306 or as such the files may be provided to a post-production module 308. The post production module 308 may perform, but not limited, non-linear edition, audio fragmentation, and humanoid skeleton generation based on the volumetric output 306. In an example embodiment, the post production module 308 may generate a humanoid skeleton that follows the performance of the user 302. The post production module 308 may apply skin weights for head retargeting to the same composition as the user 302. In an example embodiment, the post production module 308 may utilize state-of-the-art tools for implementing the same. For example, post production volumetric video editing software may enable interactive edits, touch-ups, refinements, sequencing, and the like. Based on the post production 308, a base FBX model may be created with skeleton and bone 310 and emotion 312. This base model may act as base data for a persona of the user 302 that the proposed system may use while rendering back visual experience to any user interacting or having a conversation with the system via a digital platform.

A person of ordinary skill in the art may understand that an FBX file is a format used to exchange 3D geometry and animation data.

Referring to FIG. 3, a digital human (twin) of the user 302 may be implemented using the base FBX model 310 and an AI model for emotions 314. The digital human may be implemented in a virtual environment and/or any immersive media.

Therefore, volumetric analysis as explained with reference to FIG. 3 is component responsible for extracting visual information out of data received from volumetric studio 304 recording to analyze visual data and identify different sentiments of persona.

Figure 4:
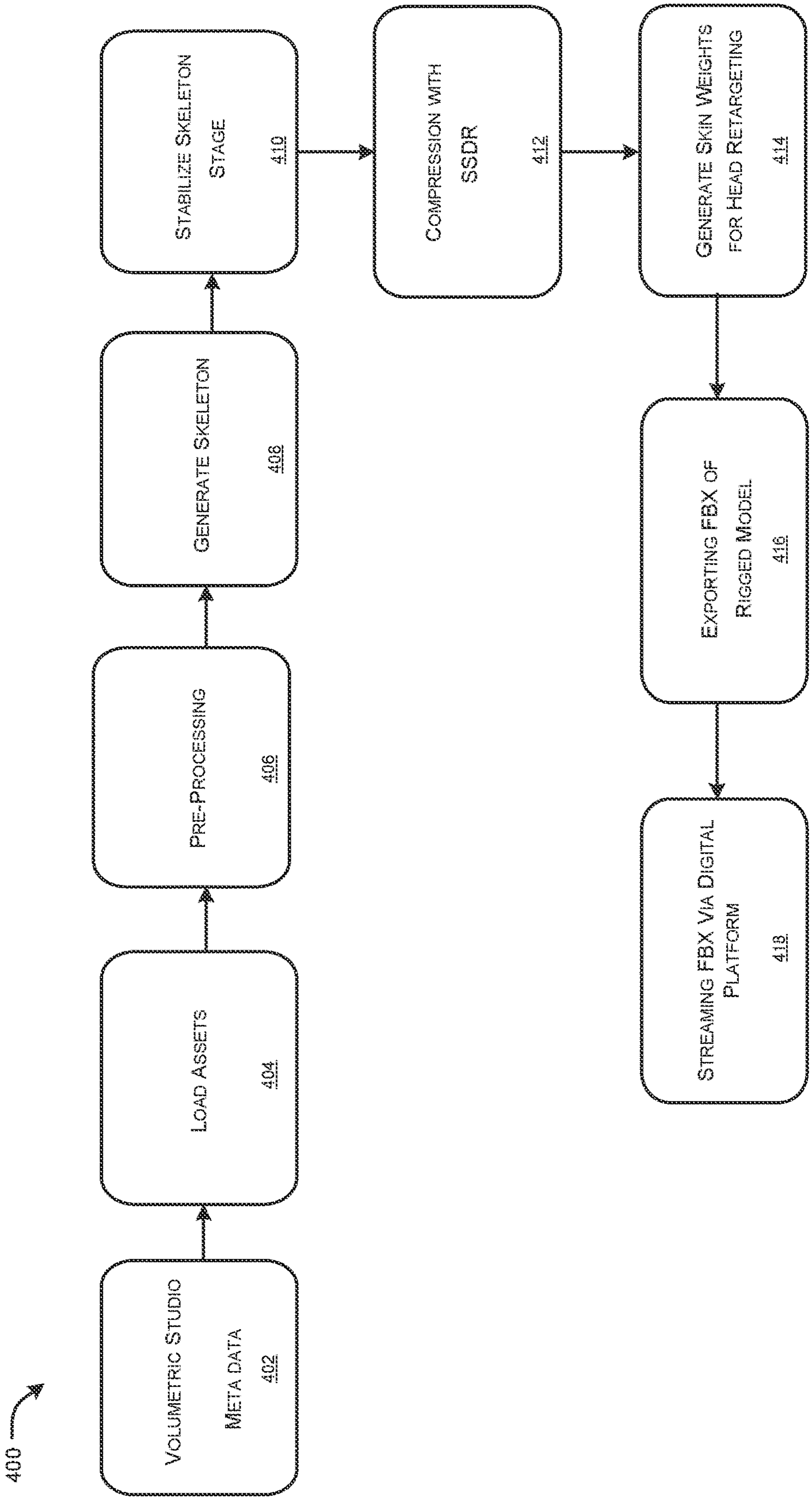
FIG. 4 illustrates an example flow diagram for volumetric model creation and streaming, in accordance with embodiments of the present disclosure.

FIG. 4 illustrates an example flow diagram of a method 400 for volumetric model creation and streaming, in accordance with embodiments of the present disclosure. The flow diagram 400 may correspond to the flow diagram 300 of FIG. 3 for implementing volumetric analysis 208.

Referring to FIG. 4, at step 402, behavior of a user such as the user 302 may be recorded in a volumetric studio such as the volumetric studio 304 or the green room 204. In an example embodiment, the volumetric studio and specifically. AI cameras and sensors in the volumetric studio may capture information or metadata corresponding to the behaviour of the user 302.

At step 404, load assets stage may introduce new data to the current metadata. In an example embodiment, audio parameters may be included at the load assets stage. In another example embodiment, the load assets stage may introduce extra data and/or re-introduce data that may be edited in an external software to generate volumetric data. For example, textures may be updated in the metadata using the load assets stage.

Further, at step 406, pre-processing stage may provide several clean-up operations for the volumetric data, for example, a mesh stream generated at the load assets stage 404. In an example embodiment, the pre-processing stage may include, but not be limited to, correcting geometry errors and reducing polygon count.

At step 408, generate skeleton stage may add rigging data, i.e., a skeleton to the volumetric data. In an example embodiment, this stage attempts to map the skeleton as closely as possible to the provided mesh stream on each frame. The generate skeleton stage may produce animation streams including a 3D skeleton.

Further, at step 410, stabilize skeleton stage may be applied to the animation streams created at the generate skeleton stage 408. This stage may be considered as a smoothing stage in order to produce a smooth 3D skeleton corresponding to the user 302.

At step 412, SSDR stage may be added to any stream with a stabilized mesh stream. In an example embodiment, the SSDR stage may product significant file size reduction. Further, one or more parameters may be applied to the streams at this stage including, but not limited to, a target bone count. As an example, the target bone count may be considered as 32 for the SSDR stage.

Further, at step 414, generate skin weights for head retargeting stage may be used to automatically generate skin weighting to use for head retargeting. In an example embodiment, this stage may help in smooth transition in order to produce a natural deformation when the volumetric actor bends the neck when the head bone is animated.

At step 416, generated data streams or rigged model may be exported in a suitable format. In an example embodiment, FBX file of the generated rigged model may be exported.

Finally, at step 418, the exported FBX file may be streamed to the user 302 via a digital platform such as the platform 106.

Therefore, the volumetric model creation and streaming as explained with reference to FIG. 4 facilitates in creating the digital human and streaming the digital human via the digital platform. It may be appreciated that the steps shown in FIGS. 3 and 4 are merely illustrative. Other suitable steps may be used for the same, if desired. Moreover, the steps of the methods 300 and/or 400 may be performed in any order and may include additional steps.

Audio Analysis 206 and/or 216

Figure 5:
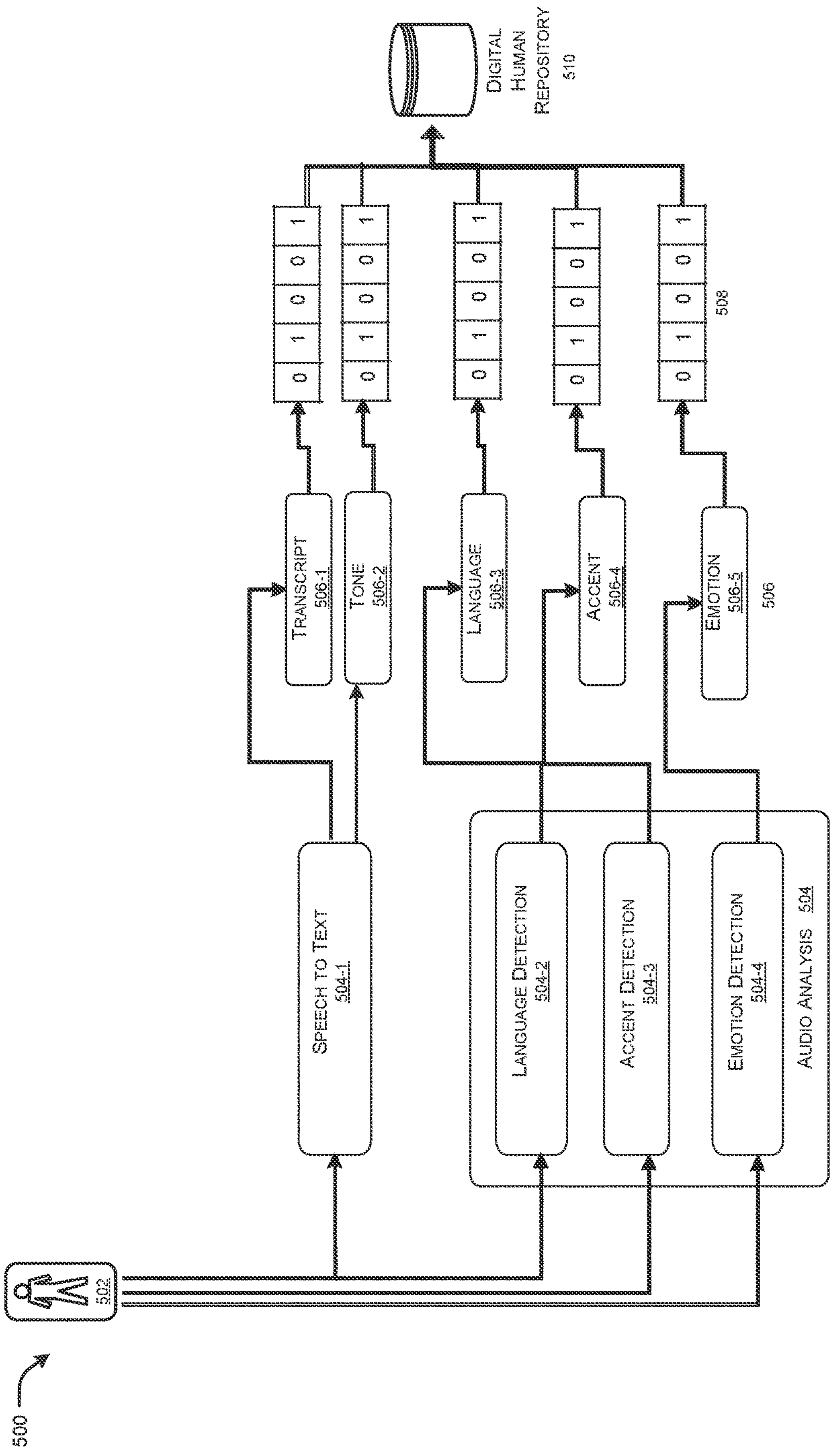
FIG. 5 illustrates an example representation for implementing audio analysis, in accordance with embodiments of the present disclosure.

FIG. 5 illustrates an example representation 500 for implementing audio analysis in a training phase as well as during real time rendering, in accordance with embodiments of the present disclosure.

As discussed above, a user 502 may read a pre-defined script in a controlled environment such as a green room 204 or a volumetric studio 304. The audio analysis 504 may include capturing audio data of the user 502 and using state-of-the-art models to process and analyse the audio data including speech and voice of the user 502. In an example embodiment, the audio analysis 504 may include, but not be limited to, speech to text conversion 504-1, language detection 504-2, accent detection 504-3, and emotion detection 504-4.

In an example embodiment, the audio analysis 504 may utilize multi-task model such as Wav2Vec 2.0 for processing and analysing the audio data, i.e. to perform speech to text conversion 504-1, language detection 504-2, accent detection 504-3, and emotion detection 504-4, and convert the audio data into embeddings 508. An embedding may refer to a low-dimensional space in which one may translate high-dimensional vectors. Embeddings make it easier to do machine learning on large inputs such as vectors representing words. Further, a person of ordinary skill in the art may understand that Wav2Vec 2.0 may refer to a state-of-the-art model for automatic speech recognition due to a self-supervised training. In an example embodiment, the audio analysis 504 may utilize Sentenc2Vec to convert speech to transcript 506-1 and Tone2Vec to convert the speech into tone 506-2. A person of ordinary skill in the art may understand that Sentenc2Vec may refer to an unsupervised model for learning general-purpose sentence embeddings such as 508. In an example embodiment, the audio analysis 504 may utilize Word2Vec to convert the speech to at least a language 506-3, an accent 506-4, and an emotion 506-5. A person of ordinary skill in the art may understand that Word2Vec may refer to a natural language processing model that uses a neural network model to learn word associations. The model can detect synonymous words or suggest additional words for a partial sentence.

Referring to FIG. 5, the generated embeddings 508 may be stored in a digital human repository 510. A person of ordinary skill in the art may understand that the digital human repository 510 may be similar to the digital human repository 110 and/or the repository 210 in its functionality, and hence, may not be described in detail again for the sake of brevity. In an example embodiment, the generated embeddings 508 corresponding to tone 506-2 may be tagged against a persona and stored in the repository 510.

Similarly, the audio analysis 504 may be performed when the user 502 interacts with the proposed system via a digital platform. In such an embodiment, the user 502 may interact with the proposed system by sending an input via the digital platform. As an example, the input may be in the form of speech. Therefore, the proposed system may perform the audio analysis 504 to identify a set of parameters associated with the input. The set of parameters may include, but not be limited to, context of the input, a level of emotion, one or more safety constraints, or the like.

Figure 6:
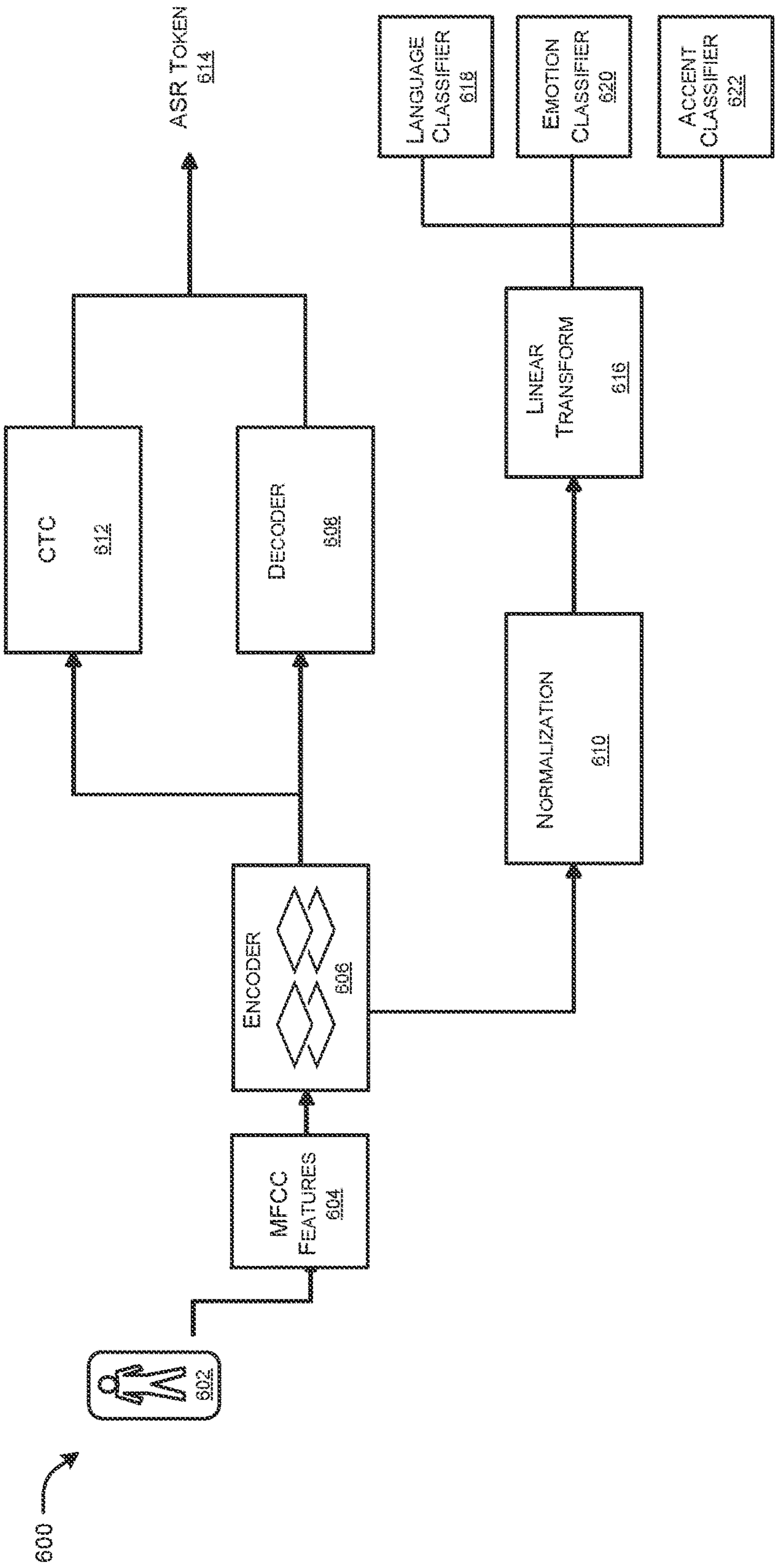
FIG. 6 illustrates an example detailed representation for implementing audio analysis, in accordance with embodiments of the present disclosure.

FIG. 6 illustrates an example detailed flow diagram of a method 600 for implementing audio analysis, in accordance with embodiments of the present disclosure.

As discussed above, a user 602 may read a pre-defined script in a controlled environment such as a green room 204 or a volumetric studio 304. At step 604, the method 600 may include mel-frequency cepstral coefficients (MFCC) feature extraction. MFCC feature extraction may refer to a technique for extracting the features from the audio data. In particular, MFCC are features that may be extracted from the audio data. A person of ordinary skill in the art may understand that MFCC feature extraction may include windowing the audio data, applying discrete fourier transform (DFT), warping the frequencies on a Mel scale, and then taking a log of magnitude, followed by applying the discrete cosine transform (DCT).

Further, the method 600 may utilize encoder-decoder long short-term memory (LSTM) 606, 608 for encoding and decoding the extracted features. Encoder-decoder LSTM may refer to a recurrent neural network designed to address sequence-to-sequence problems. In an example embodiment, at step 606, the encoder may read the extracted features and summarize the information as internal state vectors. Further, at step 608, the decoder may generate an output sequence, where initial states of the decoder may be initialized to final states of the encoder.

Referring to FIG. 6, at step 612, the output from the encoder may undergo connectionist temporal classification (CTC). The CTC may refer to a type of neural network output helpful in tackling sequence problems such as speech recognition where timing varies. The CTC may help in calculating a loss function associated with the audio data. In an example embodiment, the CTC may calculate the loss function for automatic speech recognition using below equations.

Loss Function:

$$L_{asr} = \lambda \log p_{ctc(Y|X)} + (1-\lambda)\log p_{att(Y|X)}$$

Upon convergence of $L_{asr}$

Minimize Loss $$L = \min_{\theta} \sum_{i=1}^{3} \omega_i L_i(\theta, D_i)$$

$$\text{where, } L_i = -\sum_{i=1}^{out\_size} y_i, \log(\hat{y}_i)$$

In the above equation, $L_{asr}$ is a weighted combination of $P_{att}$ and $P_{ctc}$. $P_{att}$ is an attention-based probability function that gives a probability score based on the output Y which shows how aligned is the target sequence with the model's predicted output for a given input X. $P_{ctc}$ is CTC based probability function which gives a probability score based on the output Y which shows how aligned is the current target with the model's predicted output for the given input X. Further, λ is a weight parameter. In an example embodiment, after training the speech to text model, a single model may be used to classify emotion, accent, and language. $L_i$ is the individual loss of classification model (which is cross entropy loss), $w_i$ is the weightage consideration for each individual loss, θ is the multi task model parameter, and $D_i$ is the data input. For each individual classification, the output size is different, for example, emotion may have 10 classes, and accent may have 5 classes. Furthermore, $Y_i$ is the true value (0 and 1) and $\hat{y}_i$ (0 and 1) is the predicted value.

Referring to FIG. 6, based on the CTC and the decoding, an automatic speech recognition (ASR) token 616 may be obtained. In an example embodiment, the ASR token may be stored at a repository such as the digital human repository 510.

Further, at step 610, normalization may be performed on the output obtained from the encoder at step 606. In an example embodiment, the normalization may include, but not be limited to, performing a mean and/or a standard deviation of the internal state vectors from the encoder. Furthermore, at step 612, linear transformation may be performed on the output obtained from normalization at step 610.

Referring to FIG. 6, the output obtained from the linear transformation is passed through classifiers including, but not limited to, a language classifier 618, an emotion classifier 620, and an accent classifier 622. In an example embodiment, the language classifier 618 may classify and/or detect language from the output, the emotion classifier 620 may classify and/or detect emotion from the output, and the accent classifier 622 may classify and/or detect accent from the output. It may be understood that the ASR token (i.e., transcript and tone), the language, the emotion, and the accent may be stored at the digital human repository 510. In an example embodiment, the digital human repository 510 may contain different persona profiles corresponding to respective persons.

Therefore, the audio data captured during the training phase may be tagged and segregated into different persona profiles to be used for real time rendering of the digital human. It may be appreciated that the steps and/or components shown in FIGS. 5 and 6 are merely illustrative. Other suitable steps and/or components may be used for the same, if desired.

Figure 7:
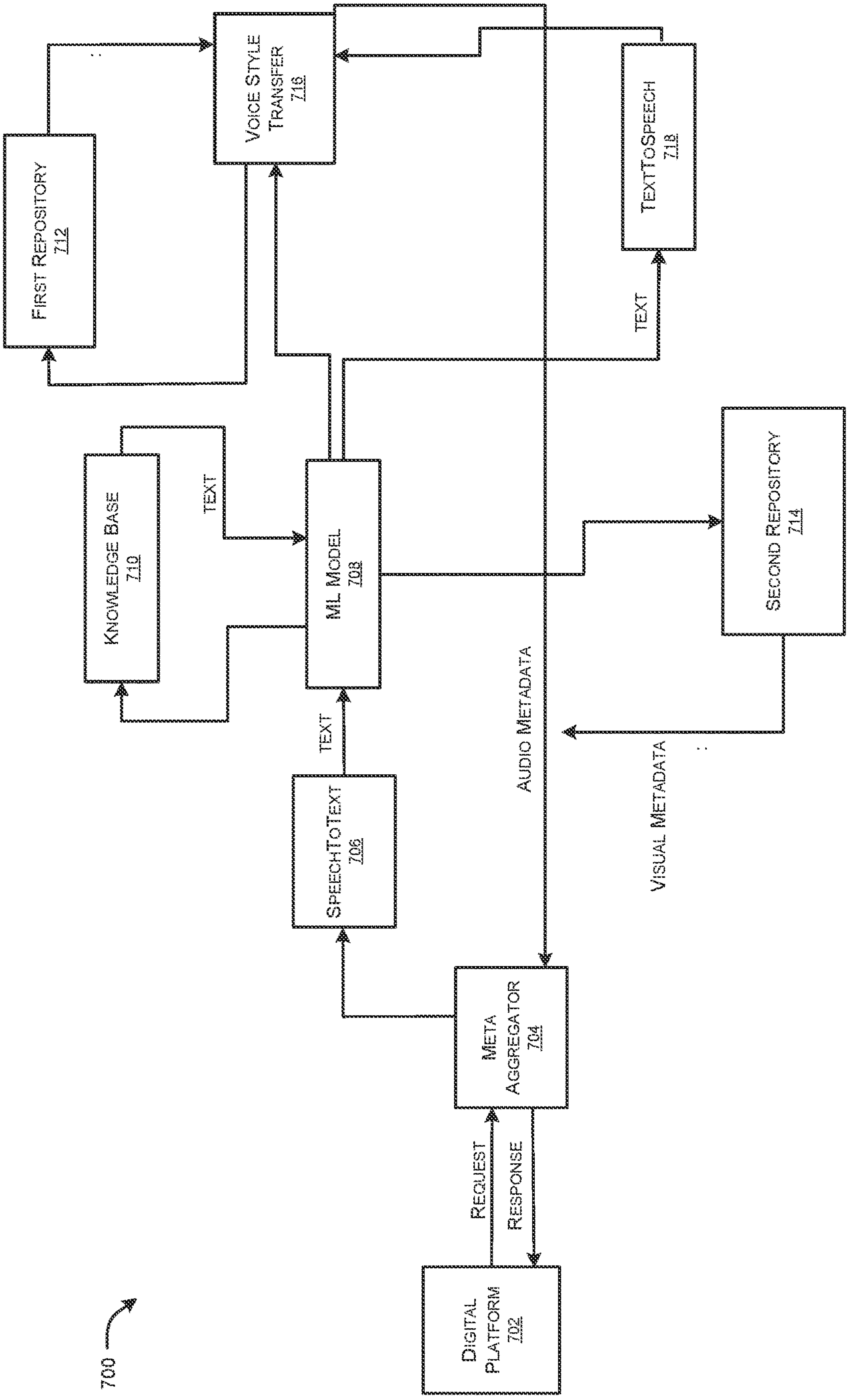
FIG. 7 illustrates an example operating architecture of components and integrations for providing a digital human in a virtual environment, in accordance with embodiments of the present disclosure.

FIG. 7 illustrates an example operating architecture of a proposed system 700 comprising components and integrations for providing a digital human in a virtual environment, in accordance with embodiments of the present disclosure. In this embodiment, the operating architecture 700 may include a digital platform 702, a meta aggregator 704, a speech to text conversion module 706, and a machine learning (ML) model 708, a knowledge base 710, a first repository 712, a second repository 714, a voice style transfer module 716, and a text to speech conversion module 718.

Referring to FIG. 7, the proposed system 700 may receive a request from a user via the digital platform 702. In an example embodiment, the digital platform 702 may comprise a website or a mobile application which may be accessed by the user using a respective computing device (for example, 218). In an example embodiment, the computing device may execute an application that may be used by the user to communicate with the proposed system 700. The application may comprise the digital platform 702. In an example embodiment, the application may be a web application. In an example embodiment, the application may be a mobile application. The mobile application may be installed on the computing device of the user. In an example embodiment, there are no software downloads required in order to practice the present disclosure. In this case, the digital platform may be server hosted. In another example embodiment, the application may be a desktop application. In an example embodiment, the application may include a virtual reality (VR) or an augmented reality (AR) application.

Considering an example, the user may send the request to ask "what is my insurance coverage?" Additionally, the user may select a persona from a plurality of personas for the digital human via the digital platform.

Referring to FIG. 7, the meta aggregator 704 may receive the request and forward the request to the speech to text conversion module 706. In an example embodiment, the request may be in the form, but not limited to, text, audio, video, or the like. The speech to text conversion module 706 may convert the received request into a transcript or text format for further processing. In an example embodiment, the speech to text conversion module 706 may identify a set of parameters associated with the request. The set of parameters may include, but not be limited to, a context of the request, a level of emotion, tone, language, accent, and one or more safety constraints. A person of ordinary skill in the art may understand that the speech to text conversion module 706 may be similar to 504-1 in its functionality, and hence, may not be described in detail again for the sake of brevity. Considering the example, the speech to text conversion module 706 may identify the speech, tone, language, emotion, and accent from the request. That is, the question is "wat is my insurance coverage," name of the user is "John," the accent used by the user is "English." Additionally, the module 706 may identify other details such as user details, industry, or the like associated with the request received from the user.

The speech to text conversion module 706 may send the text (request) to the ML model 708 and the knowledge base 710. In an example embodiment, the knowledge base 710 may generate a response information for the text (request). As an example, the knowledge base 710 may utilize the ML model 708 to generate the response information. It may be understood that the response information may be in the form of text. A person of ordinary skill in the art may understand that the knowledge base 710 may be similar to the knowledge repository 112 and/or 214 in its functionality.

In an example embodiment, the ML model 708 may perform sentiment analysis to determine the response information. In an example embodiment, the ML model 708 may implement a neural network ML model, such as, but not limited to Open AI Generative Pre-trained Transformer 3 (GPT3) to determine the response information. Considering the example above, the ML model may determine the response information including, but not limited to, an answer, an emotion score, sentiment details, or the like such as the answer to the question may be "your insurance coverage is 5 lacs," the emotion score may be "0.7," and sentiment details may include sentiment value and sentiment score, i.e. "anger: 0.08, joy: 0.11, intensity: p1." In an example embodiment, the emotion score may be calculated by grouping emotions into positive and negative sections. For example, emotions like anger, sad, fear, etc. may be grouped in the negative section, and emotions like happy, excitement, etc. may be grouped in the positive section. In an example embodiment, the emotion score may be calculated based on a weighted addition of probability scores. The emotion may be selected based on the probability score of classification model, and the level of emotion may be selected based on the weighted addition of the probability scores of emotions belonging to the positive and negative sections.

Referring to FIG. 7, the voice style transfer module 716 may receive the response information from the knowledge base 710 implementing the ML model 708. The voice style transfer module 716 may send the response information to the first repository 712 in order to retrieve a set of attributes corresponding to the response information. In an example embodiment, the first repository 712 may store audio attributes corresponding to persona profiles stored during the training phase of the proposed system 700. The first repository 712 may retrieve a persona profile corresponding to the persona selected by the user via the digital platform. Based on the retrieved persona, the first repository 712 may provide the corresponding audio attributes to the voice style transfer module 716. In an example embodiment, the audio attributes may be stored in the form of files (for example, .wav files). In an example embodiment, the audio attributes may include, but not be limited to, language, emotion, accent, or the like. The first repository 712 may provide the retrieved audio attributes (files) to the voice style transfer module 716.

Referring to FIG. 7, the text to speech conversion module 718 may receive the response information from the knowledge base 710 implementing the ML model 708. The text to speech conversion module 718 may convert the textual response information into speech. Further, the text to speech conversion module 718 may provide the speech (or .wav file) to the voice style transfer module 716.

The voice style transfer module 716, based on the received audio attributes (i.e., from the first repository 712) and the speech (i.e., from the text to speech conversion module 718) may transfer the speech according to the audio attributes, i.e., the module 716 may perform voice style transfer, emotion transfer, accent transfer, or the like to generate audio metadata. In an example embodiment, the voice style transfer module 716 may provide the audio metadata to the meta aggregator 704.

Referring to FIG. 7, the second repository 714 may receive the response information from the knowledge base 710 implementing the ML model 708. In an example embodiment, the second repository 714 may store visual attributes corresponding to persona profiles stored during the training phase of the proposed system 700. The second repository 714 may retrieve a persona profile corresponding to the persona selected by the user via the digital platform. Based on the retrieved persona, the second repository 714 may provide the corresponding visual attributes to the meta aggregator 704. In an example embodiment, the visual attributes may be stored in the form of files (for example, .fbx files). In an example embodiment, the visual attributes may include, but not be limited to, body movements, gestures, facial expressions, or the like. The second repository 714 may provide the retrieved visual attributes (files) to the meta aggregator 704 in the form of visual metadata.

A person of ordinary skill in the art may understand that the first repository 712 and the second repository 714 may be similar to the digital human repository 110 of FIGS. 1 and/or 210 of FIG. 2 in their functionality.

Referring to FIG. 7, the meta aggregator 704 may combine and/or aggregate the audio metadata (i.e., from the voice style transfer module 716) and the visual metadata (i.e., from the second repository 714) to generate a personalized response for the request received from the user. In particular, the meta aggregator 704 may apply the knowledge base 710 to generate the personalized response using suitable audio and visual metadata to make conversation with the user more human-like and personalized. A person of ordinary skill in the art may understand that the meta aggregator 704 may be similar to the meta aggregator 108 of FIG. 1 in its functionality. For example, the meta aggregator 704 may perform aggregation, validation, synchronization, and sanitization.

The meta aggregator 704 may render the personalized response to the user by the digital human via the digital platform 702.

Although FIG. 7 shows exemplary components of the system 700, in other embodiments, the system 700 may include fewer components, different components, differently arranged components, or additional functional components than depicted in FIG. 7. Additionally, or alternatively, one or more components of the system 700 may perform functions described as being performed by one or more other components of the system 700.

Knowledge Base 710 and ML Model 708

Figure 8:
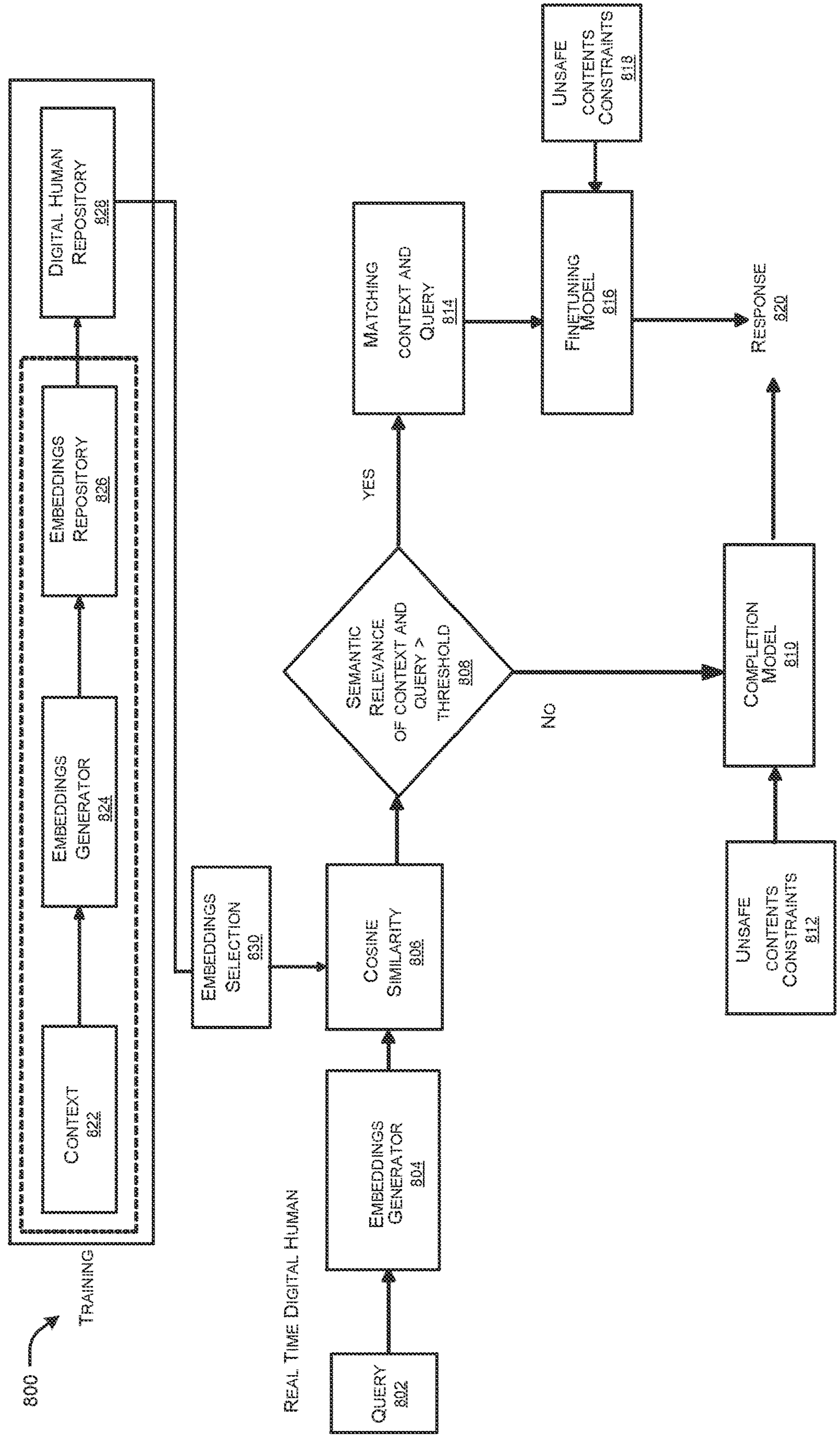
FIG. 8 illustrates an example flow diagram for implementing a knowledge base, in accordance with embodiments of the present disclosure.

FIG. 8 illustrates an example flow diagram of a method 800 for implementing a knowledge base such as the knowledge base 710 and ML model 708, in accordance with embodiments of the present disclosure.

At step 802, the method 800 may include receiving a query in the form of request or input from a user interacting with the proposed system via a digital platform. As discussed above, the request or query may be in the form of speech. At step 804, an embeddings generator may be implemented that may convert the speech input into embeddings. In an example embodiment, the embeddings generator may identify a set of parameters including, but not limited to, context associated with the request, level of emotion, and the like.

Referring to FIG. 8, during the training phase of the proposed system, audio data may be analysed and converted into embeddings, as explained in detail with reference to FIG. 5 above. In particular, the proposed system may identify the context 822 of the audio data used for training the system. Further, appropriate state-of-the-art models may be implemented at an embeddings generator 824 to convert the audio data into embeddings. These embeddings, generated during the training phase, may be stored in an embeddings repository 826. In an example embodiment, the embeddings may be stored in a digital human repository 828. At step 830, embeddings may be selected from the digital human repository 828 corresponding to the identified set of parameters associated with the query 802.

At step 806, the method 800 may include determining embeddings based on a similarity relevance between the generated embeddings (from step 804) and the selected embeddings (from step 830). In an example embodiment, the embeddings based on the similarity relevance may be determined using a cosine similarity function. The cosine similarity function may refer to a measure of similarity between two sequences of numbers (in this case, the generated and the selected embeddings).

At step 808, the method 800 may include determining whether a semantic relevance between the identified context and the query is greater than a pre-configured threshold. In an example embodiment, the pre-configured threshold may refer to a similarity parameter that corresponds to the semantic relevance between the context and the query based on the determined embeddings.

In response to a positive determination at step 814, i.e., the semantic relevance is greater than the pre-configured threshold, the method 800 may determine that the context and the query match. In this embodiment, the method 800 may include determining response information from a knowledge base (i.e., knowledge base 710) using a neural network ML model (i.e., ML model 708) at step 816. In an example embodiment, a fine tuning model may be applied to determine the response information. In an example embodiment, at step 818, the method 800 may include identifying if there are any unsafety constraints associated with the query 802 received from the user. In such an embodiment, the ML model may consider such unsafety constraints to generate an appropriate response 820 to the query 802.

In response to a negative determination, i.e., the semantic relevance is less than the pre-configured threshold, the method 800 may determine response information based on a completion model 810 taking unsafety constraints 812 into account.

It may be appreciated that the steps shown in FIG. 8 are merely illustrative. Other suitable steps may be used for the same, if desired. Moreover, the steps of the method 800 may be performed in any order and may include additional steps.

Digital Human Repository 110 or 210 or 510/First Repository 712 and Second Repository 714

Figure 9:
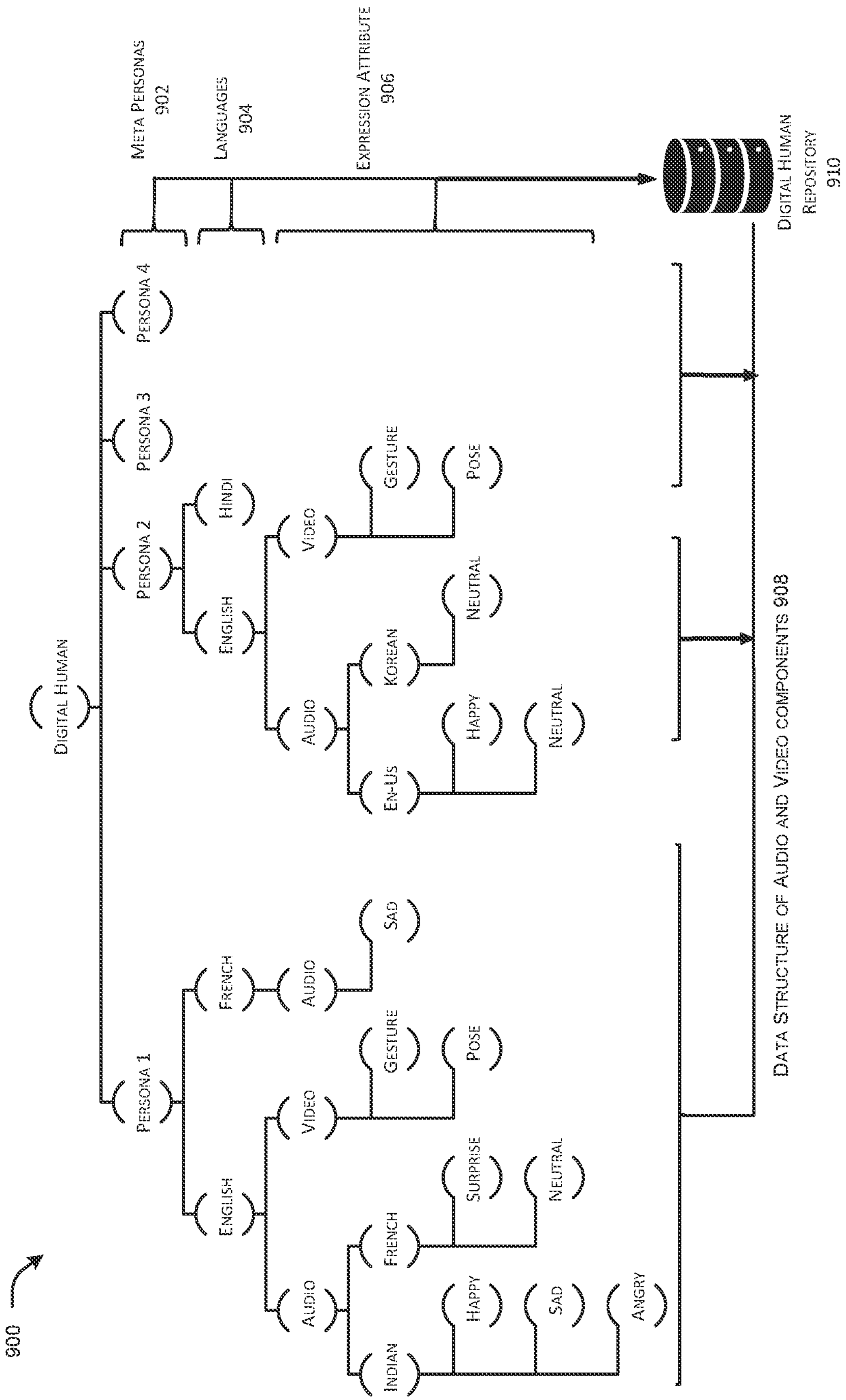
FIG. 9 illustrates an example representation of a digital human repository, in accordance with embodiments of the present disclosure.

FIG. 9 illustrates an example representation 900 of a digital human repository, in accordance with embodiments of the present disclosure.

Referring to FIG. 9, digital human repository 910 may include a data structure of audio and visual attributes 908 as stored during the training phase of the proposed system. In an example embodiment, the digital human repository 910 may include persona profiles. Each persona profile may correspond to a respective meta persona 902, for example, persona 1, persona 2, persona 3, persona 4, and so on. Each meta persona 902 may include language attributes 904, i.e., the languages supported by the respective persona. As an example, the language attributes 904 may include English, French, Hindi, and so on. Further, with respect to each language attribute 904, the digital human repository 910 may include expression attributes 906. The expression attributes 906 may include various audio attributes and visual attributes. It may be appreciated that the representation 900 shown in FIG. 9 is merely illustrative, and does not comprise an exhaustive list of attributes that may be stored in the digital human repository 910. Other suitable attributes may also be stored in the digital human repository 910 that are within the scope of the ongoing disclosure.

Figure 10:
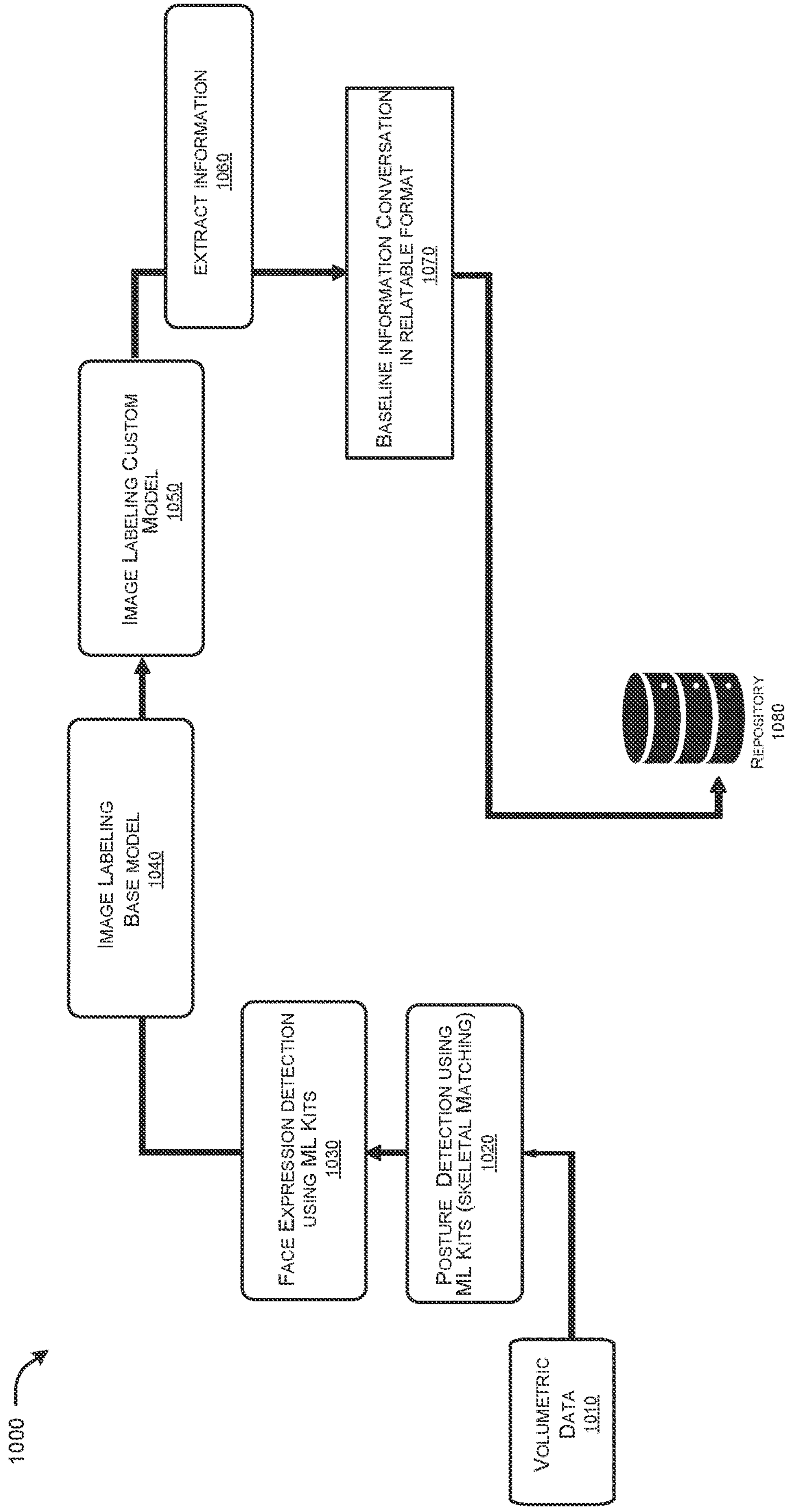
FIG. 10 illustrates an example flow diagram for implementing a digital human repository, in accordance with embodiments of the present disclosure.

FIG. 10 illustrates an example flow diagram of a method 1000 for implementing a digital human repository such as the digital human repository 910, in accordance with embodiments of the present disclosure.

At step 1010, the proposed method 1000 may include capturing volumetric data associated with a user during a training phase of the proposed system. It may be appreciated that volumetric data may correspond to the description of volumetric analysis explained in detail with reference to FIGS. 3 and 4, and hence, may not be described in detail again for the sake of brevity.

Further, at step 1020, the method 1000 may include detecting posture of the user using appropriate ML models. At step 1030, the method 1000 may include detecting face expression of the user using appropriate ML models.

Furthermore, at step 1040, the captured image may be labelled to generate a base model. At step 1050, the image obtained from the base model may be labelled to generate a custom model. In an example embodiment, the custom model may be personalized based on different personas associated with a user. In an example embodiment, the method 1000 may include, at step 1060, extracting information from the custom model. The extracted information may be converted in a relatable format, for example, to implement a neural network ML model for further processing. In an example embodiment, the information may be converted into a GPT relatable format.

Further, all the gathered information may be tagged and segregated into various personas (or, persona profiles) and stored at the repository 1080 (similar to the digital human repository 910).

Therefore, the audio and visual attributes stored at the repository 1080 may be used by the proposed system during real time rendering of the digital human, for example, to interact in a human-like conversation with user(s).

Figure 11:
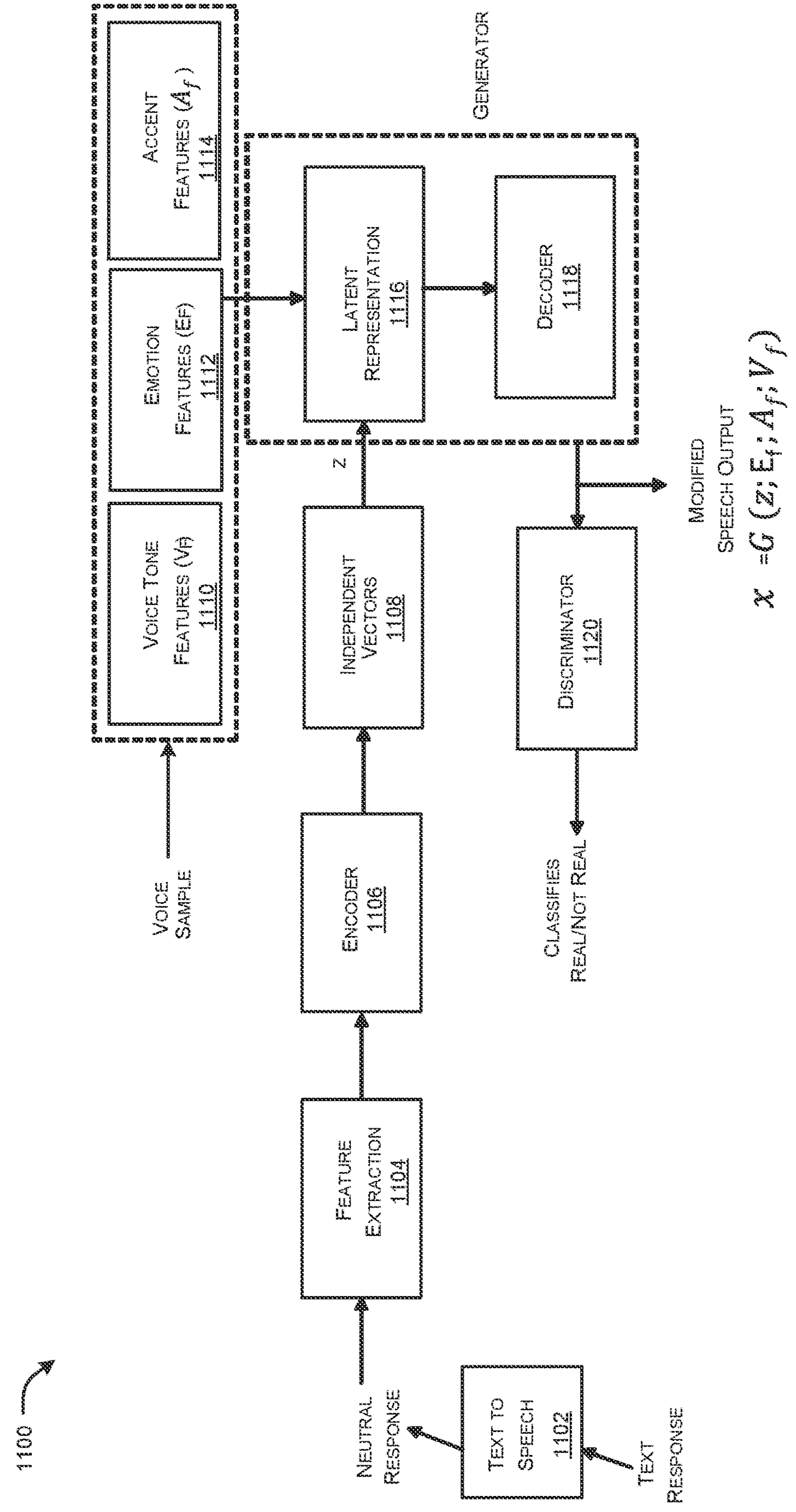
FIG. 11 illustrates an example flow diagram for implementing a voice style transfer module of a meta aggregator, in accordance with embodiments of the present disclosure.

FIG. 11 illustrates an example flow diagram 1100 for implementing a voice style transfer module of a meta aggregator, in accordance with embodiments of the present disclosure.

Referring to FIG. 11, a text to speech converter 1102 may convert text response to speech to generate a neutral response. Based on the neutral response, a feature extraction module 1104 may extract one or more features.

Further, an encoder 1106 may encode the one or more features to generate independent vectors at 1108. Referring to FIG. 11, based on user selection of a persona for a digital human and the text response received from a knowledge base, the voice style transfer module 1100 of the meta aggregator may generate one or more features such as, but not limited to, voice tone features 1110, emotion features 1112, and accent features 1114. These features may be stored in a feature repository. The independent vectors 1108 along with the features from the feature repository may form a latent representation 1116.

Referring to FIG. 11, the latent representation thus formed may be applied at a decoder 1118 in order to produce a final response taking the voice tone features 1110, the emotion features 1112, and the accent features 1114 from the feature repository into account. Further, in an example embodiment, the final response may be applied at a discriminator 1120 to classify if the generated response is real or fake.

Figure 12:
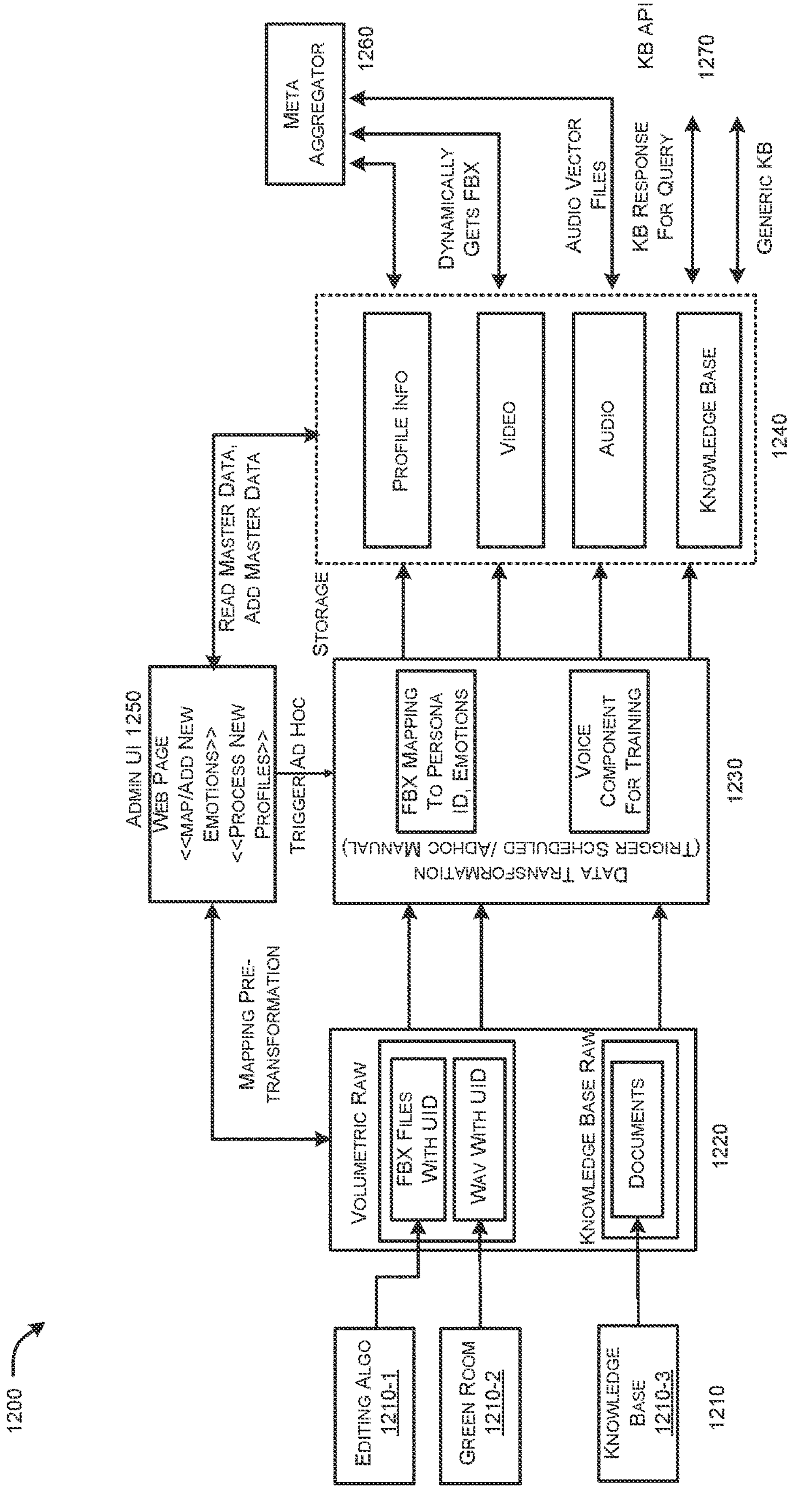
FIG. 12 illustrates an example block diagram for implementing a digital human repository for performing data transformation, in accordance with embodiments of the present disclosure.

FIG. 12 illustrates an example block diagram 1200 for implementing a digital human repository for performing data transformation, in accordance with embodiments of the present disclosure.

Referring to FIG. 12, blocks 1210, 1220, and 1230 may be implemented during a training phase of the proposed system 1200, while blocks 1240 and 1260 may be implemented during real time rendering of a digital human through the proposed system 1200.

A green room 1210-2 may be set up for recoding a behavior of a user. In an example embodiment, the green room 1210-2 may be set up for recording audio and video files of different personas corresponding to the user. Further, an editing algorithm 1210-1 may be used for creating a skeleton of recorded video files, as explained in detail with reference to FIGS. 3 and 4 above. Furthermore, a knowledge base 1210-3 may be used for extracting textual information. In an example embodiment, information from the editing algorithm 1210-1, the green room 1210-2, and the knowledge base 1210-3 may be stored in form of raw files 1220 as volumetric raw data and knowledge base raw data. In an example embodiment, the volumetric raw data may include video recordings in the form of fbx and wav files. Further, the knowledge base raw data may include relevant documents. These raw files 1220 may be stored for further processing.

In an example embodiment, an administrative user interface (admin UI) 1250 may read the raw files 1220 and add new data, as and when needed. In an example embodiment, the admin UI 1250 may map the raw files against a persona and an accent, for example, before transformation at block 1230. Additionally, the admin UI 1250 may map the raw files against an emotion. In an example embodiment, the admin UI 1250 may manage the personas for scheduled processing of a data transformation scheduler 1230. Alternatively, the admin UI 1250 may invoke an adhoc processing of the data transformation scheduler 1230.

Referring to FIG. 12, the data transformation scheduler 1230 may map the personas into specific profiles and store the profiles in a repository 1240. Further, the data transformation scheduler 1230 may map the processed raw files and store the same in video and audio repositories corresponding to specific persona profiles in the repository 1240. Additionally, the repository 1240 may store the textual information corresponding to the knowledge base 1210-3.

During real time rendering of the digital human through the proposed system 1200, a meta aggregator 1260 may dynamically retrieve information from the repository 1240. Similarly, a knowledge base application programing interface (API) 1270 may be processed in order to retrieve response information from the knowledge base corresponding to a query posted by the user.

Although FIG. 12 shows exemplary components of the system 1200, in other embodiments, the system 1200 may include fewer components, different components, differently arranged components, or additional functional components than depicted in FIG. 12. Additionally, or alternatively, one or more components of the system 1200 may perform functions described as being performed by one or more other components of the system 1200.

Figure 13:
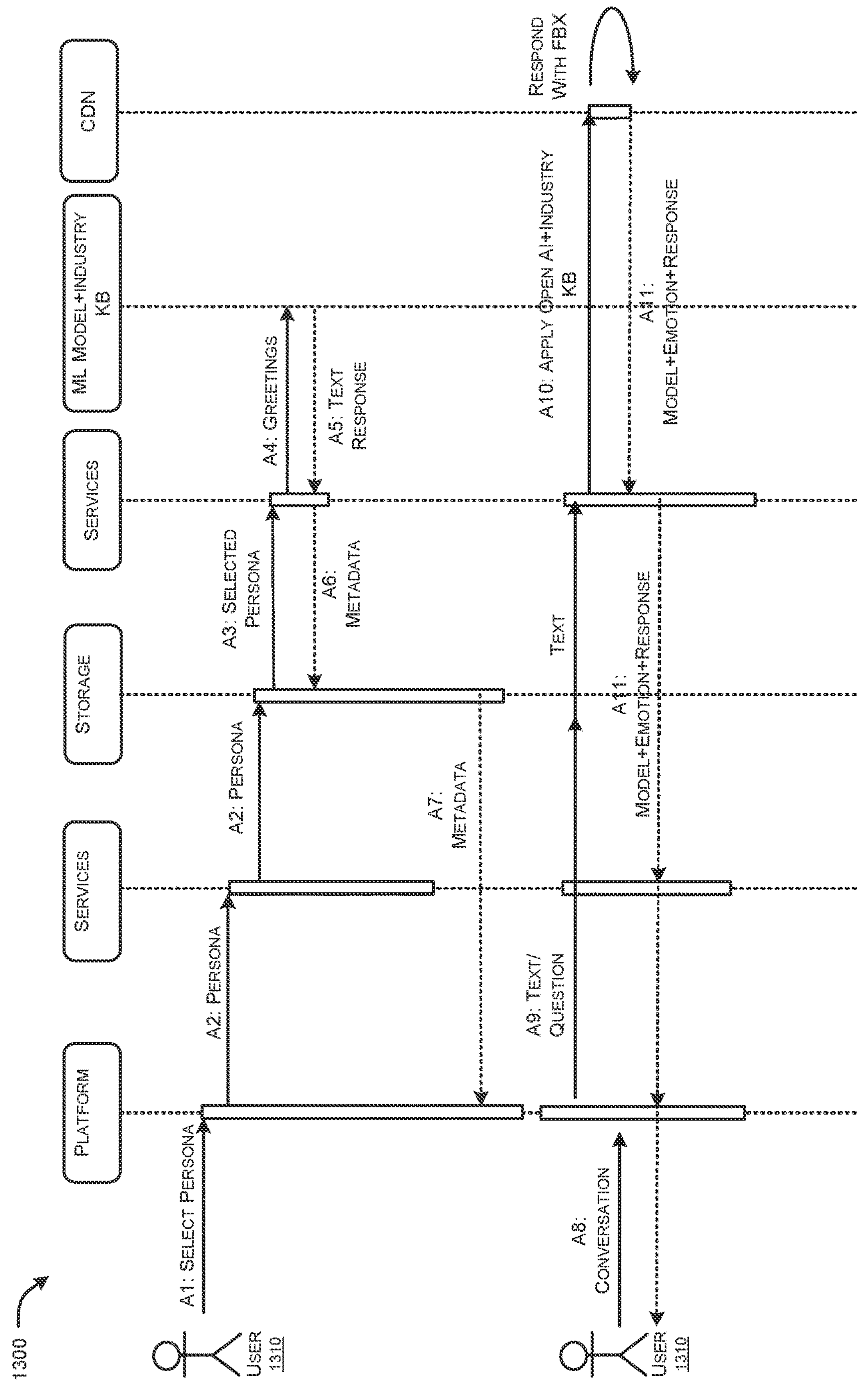
FIG. 13 illustrates an example sequence diagram for facilitating communication between a user and a digital human, in accordance with embodiments of the present disclosure.

FIG. 13 illustrates an example sequence diagram 1300 for facilitating communication between a user and a digital human, in accordance with embodiments of the present disclosure.

Referring to FIG. 13, a user 1310 may select a persona from a plurality of personas via a digital platform at step A1. At steps A2 and A3, the selected persona may be sent to a storage module such as a repository (or, digital human repository). In an example embodiment, the selected persona may be sent to knowledge base. At step A4, based on the selected persona, the knowledge base implementing an ML model may retrieve greetings for the user 1310. In an example embodiment, at step A5, the knowledge base may determine textual response corresponding to the greetings. At step A6, the repository may provide audio metadata and video metadata corresponding to the selected persona. In an example embodiment, a meta aggregator may combine the textual response, the audio metadata, and the video metadata. At step A7, the combined response may be rendered via the platform to the user 1310 by the digital human. It may be understood that the digital human may interact with the user 1310 by speaking and behaving based on the selected persona, for example, corresponding to the retrieved audio metadata and the video metadata.

Further, the user 1310 may initiate a conversation with the proposed system at step A8 by sending an input or a query or a request via the digital platform. At step A9, the input may be sent to the knowledge base for further processing. In an example embodiment, the meta aggregator may identify a set of parameters associated with the input such as, but not limited to, context of the input, and the like. At step A10, the knowledge base may implement appropriate AI/ML models to determine response information corresponding to the input based on the identified set of parameters. Additionally, a content delivery network (CDN) implemented in the repository may respond with visual attributes corresponding to the response information. Further, the repository may also respond with audio attributes corresponding to the response information. At step A11, the meta aggregator may combine the response information (text) with the audio and the visual attributes to generate a personalized response for the user 1310. Finally, the meta aggregator may render the personalized response to the user 1310 via the digital platform by the digital human.

It may be appreciated that the steps shown in FIG. 13 are merely illustrative. Other suitable steps may be used for the same, if desired. Moreover, the steps of the method 1300 may be performed in any order and may include additional steps.

Figure 14:
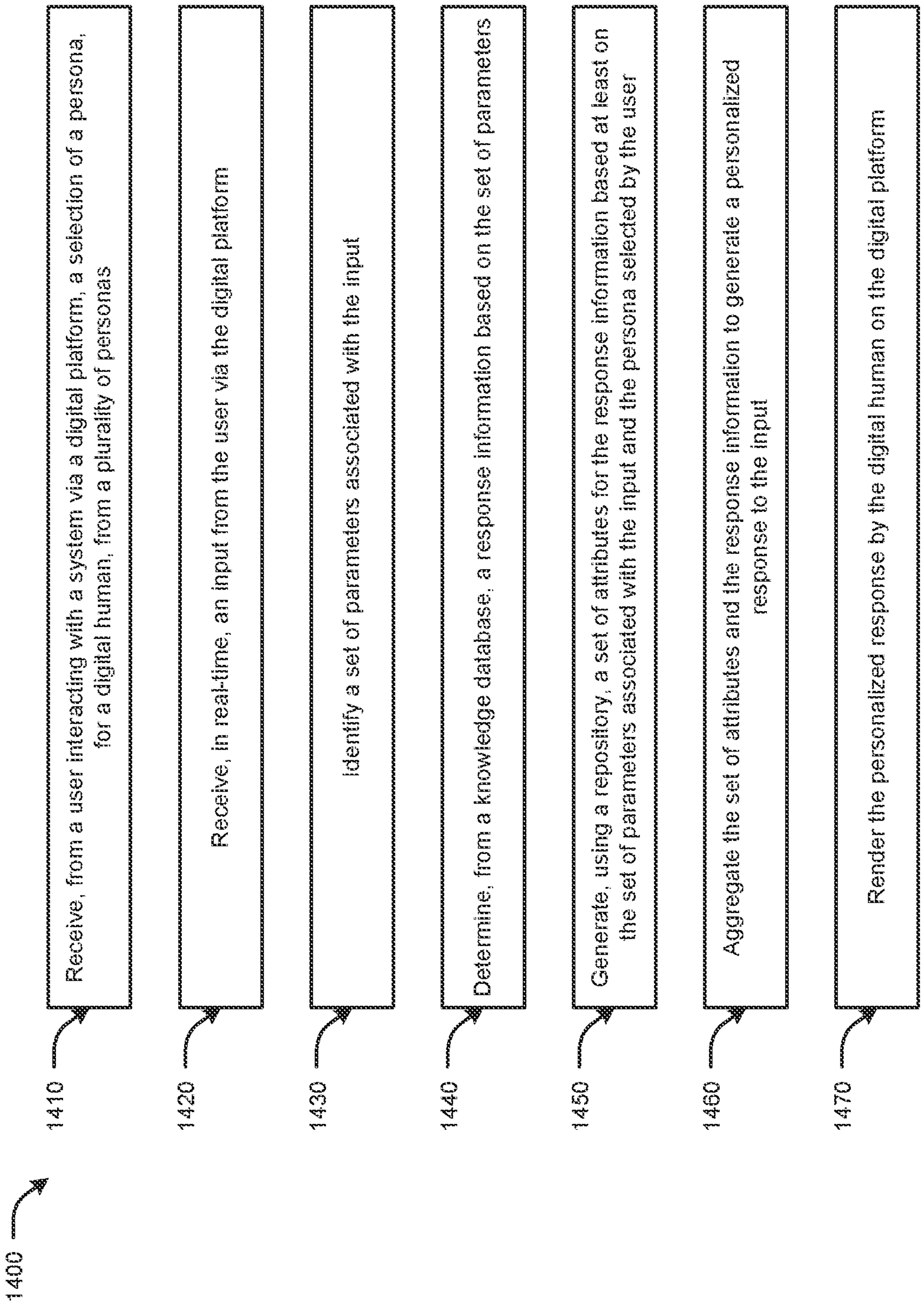
FIG. 14 illustrates an example flow diagram of a method for facilitating communication with a digital human in a virtual environment, in accordance with embodiments of the present disclosure.

FIG. 14 illustrates an example flow diagram of a method 1400 for facilitating communication with a digital human in a virtual environment, in accordance with embodiments of the present disclosure.

At step 1410, the method 1400 may include receiving, from a user interacting with the proposed system via a digital platform, a selection of a persona from a plurality of personas for a digital human. In an example embodiment, the digital platform may be one of a messaging service, an application, or an AI user assistance platform. In an example embodiment, the digital platform may include an immersive media experience for the user. As an example, the digital platform may include an AR/VR environment.

At step 1420, the method 1400 may include receiving an input from the user via the digital platform. The input may be received in real time. As an example, the input may correspond to a query posted by the user via the digital platform. Further, at step 1430, the method 1400 may include identifying a set of parameters associated with the input. In an example embodiment, the set of parameters may include a context of the input, a level of emotion associated with the input, and one or more safety constrains.

At step 1440, the method 1400 may include determining a response information based on the identified set of parameters. In an example embodiment, a knowledge base may determine the response information based at least on the context of the input. In an example embodiment, the method may include generating embeddings associated with the input. Further, the method may include selecting embeddings from the knowledge base based on the generated embeddings associated with the input and determining a similarity parameter based on a comparison of the generated and the selected embeddings. The embeddings may correspond to at least one of a transcript, a tone, a language, an accent, and an emotion associated with the input. In an example embodiment, the method may include determining whether the similarity parameter is greater than a predefined threshold. The similarity parameter may correspond to a semantic relevance of the context and the input based on the selected embeddings. In response to a positive determination, the knowledge base may determine the response information using a fine tuning neural network ML model. In response to a negative determination, the knowledge base may determine the response information using a neural network ML model.

Referring to FIG. 14, at step 1450, the method 1400 may include generating a set of attributes for the response information using a repository. In an example embodiment, the repository may generate the set of attributes based at least on the set of parameters associated with the input and the persona selected by the user. In an example embodiment, the set of attributes may correspond to at least an audio attribute and a visual attribute. In an example embodiment, the repository may access a persona profile associated with the selected persona and retrieve information corresponding to the set of attributes based on the persona profile. In an example embodiment, the repository may include a first repository and a second repository. The first repository may include the audio attributes and the second repository may include the visual attributes. In an example embodiment, the audio attributes may include, but not be limited to, voice tone features, emotion features, accent features, and language features. In an example embodiment, the visual attributes may include, but not be limited to, facial expressions, gestures, volumetric data, and body movements.

Further, at step 1460, the method 1400 may include aggregating the set of attributes and the response information to generate a personalized response to the input. In an example embodiment, a meta aggregator, as explained herein, may aggregate the set of attributes, i.e. the audio attributes and the visual attributes, with the response information to generate the personalized response.

At step 1470, the method 1400 may include rendering the personalized response by the digital human on the digital platform. In an example embodiment, the digital human behaves like a human corresponding to the persona selected by the user.

Therefore, the disclosure may implement a training phase and a run-time phase. The training phase may include, but not be limited to, all the knowledge base related artifacts like policy documents, frequently asked questions (FAQs), and the like to be initially uploaded through an administrator user interface. A knowledge base model may process these documents/content, generate embeddings, and store the embeddings in an embeddings repository for domain specific data/information.

The run-time phase may include, but not be limited to, receiving user query post speech to text conversion. The embeddings may be generated for the user query and the respective knowledge base domain may be selected based on the embeddings.

The user query embedding may look for the closest match in the domain specific knowledge database using techniques like cosine similarity, and fetch the closest match from the knowledge database as a response.

The matching context that the cosine similarity model generated may be compared to some factors like relevance to the user query, and if that score is greater than the pre-defined threshold, then the context may be routed to a fine-tuning model and the response from the same may be processed as output. If the score is less than the pre-defined threshold, then the context may be routed to a generic neural network ML model (e.g., GPT3 model) to get the response as output.

A person of ordinary skill in the art will readily ascertain that the illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 15:
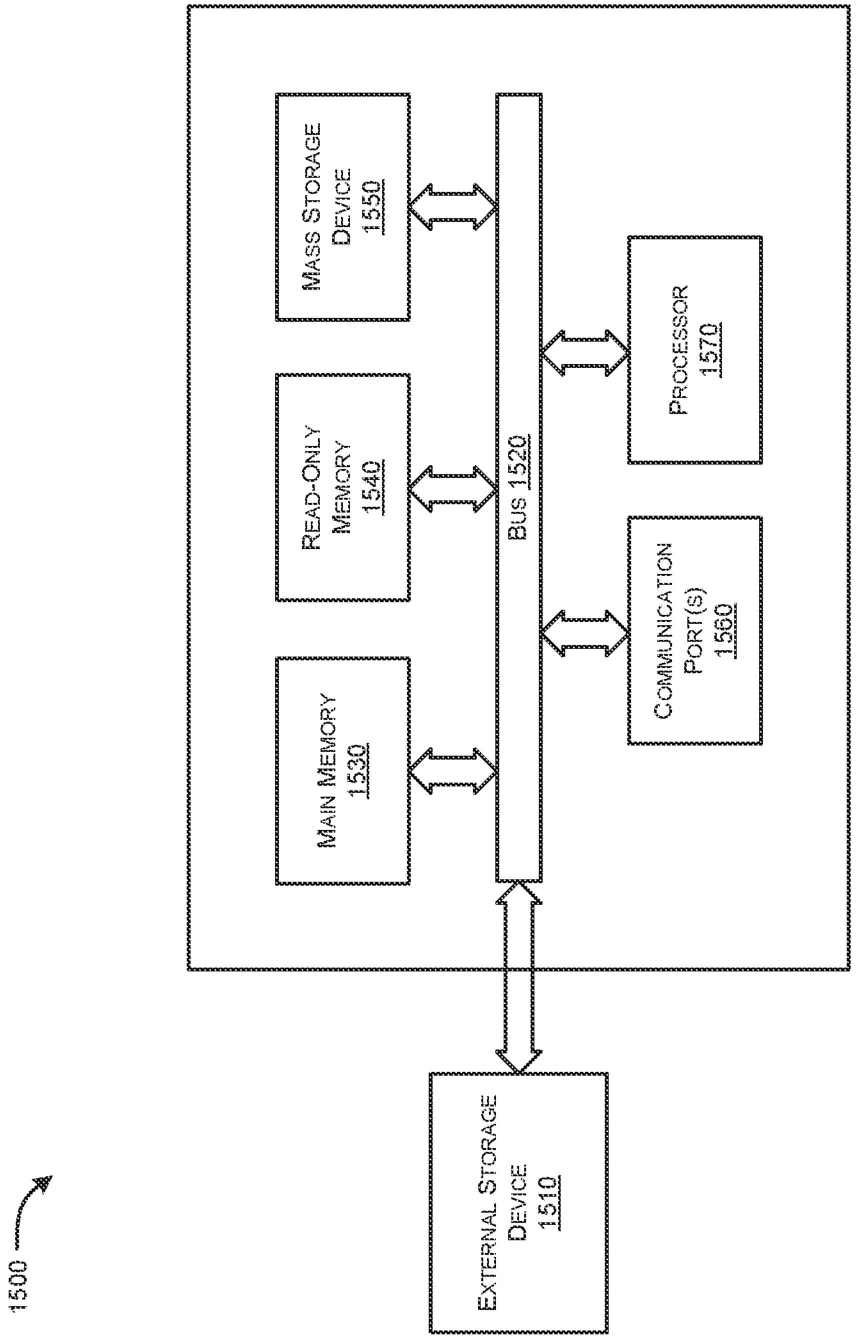
FIG. 15 illustrates a computer system in which or with which embodiments of the present disclosure may be implemented.

FIG. 15 illustrates a computer system 1500 in which or with which embodiments of the present disclosure may be implemented.

Referring to FIG. 15, the computer system 1500 may include an external storage device 1510, a bus 1520, a main memory 1530, a read-only memory 1540, a mass storage device 1550, communication port(s) 1560, and a processor 1570. A person skilled in the art will appreciate that the computer system 1500 may include more than one processor and communication ports. The communication port(s) 1560 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1560 may be chosen depending on a network, such a Local Area Network (LAN), Wide Area Network (WAN), or any network to which the computer system 1500 connects. The main memory 1530 may be random access memory (RAM), or any other dynamic storage device commonly known in the art. The read-only memory 1540 may be any static storage device(s) including, but not limited to, a Programmable Read Only Memory (PROM) chips for storing static information e.g., start-up or basic input/output system (BIOS) instructions for the processor 1570. The mass storage device 1550 may be any current or future mass storage solution, which may be used to store information and/or instructions. The bus 1520 communicatively couples the processor 1570 with the other memory, storage, and communication blocks. The bus 1520 can be, e.g. a Peripheral Component Interconnect (PCI)/PCI Extended (PCI-X) bus, Small Computer System Interface (SCSI), universal serial bus (USB), or the like, for connecting expansion cards, drives, and other subsystems as well as other buses, such a front side bus (FSB), which connects the processor 1570 to the computer system 1500. Optionally, operator and administrative interfaces, e.g. a display, keyboard, and a cursor control device, may also be coupled to the bus 1520 to support direct operator interaction with the computer system 1500. Other operator and administrative interfaces may be provided through network connections connected through the communication port(s) 1560. In no manner should the aforementioned exemplary computer system limit the scope of the present disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system, comprising:

a processor; and a memory coupled to the processor, wherein the memory comprises processor-executable instructions, which on execution, cause the processor to:

receive, from a user interacting with the system via a digital platform, a selection of a persona, for a digital human, from a plurality of personas;

receive, in real-time, an input from the user via the digital platform;

identify a set of parameters associated with the input, wherein the set of parameters comprise at least a context of the input;

determine, from a knowledge database, a response information based on the context of the input, wherein determining the response information from the knowledge database includes:

generating embeddings associated with the input based on a multi-task model, wherein generating embeddings includes:

processing and analyzing audio data of the input by performing speech to text conversion, tone detection, language detection, accent detection, and emotion detection, and converting the audio data into the generated embeddings based on the processing and analyzing;

selecting embeddings from the knowledge database based on the generated embeddings associated with the input; and determining a similarity parameter based on a comparison of the generated embeddings and the selected embeddings;

generate, using a repository, a set of attributes for the response information based at least on the set of parameters associated with the input and the persona selected by the user, wherein the set of attributes correspond to at least an audio attribute and a visual attribute;

aggregate the set of attributes and the response information to generate a personalized response to the input; and render the personalized response by the digital human on the digital platform, wherein the memory comprises processor-executable instructions, which on execution, further cause the processor to:

analyze the audio data by:

recording behavior of the user reading a pre-defined script in a controlled environment;

extracting features from the audio data using a mel-frequency cepstral coefficients (MFCC) technique;

encoding and decoding the extracted features using an encoder-decoder long short-term memory (LSTM), wherein an encoder of the LSTM reads the extracted features and outputs summarized information as internal state vectors, and a decoder of the LSTM generates an output sequence which is initialized from final states of the encoder;

applying a connectionist temporal classification (CTC) to the output of the encoder to calculate a loss function associated with the audio data;

performing a normalization on the output obtained from the encoder;

performing a linear transformation on the normalized output; and classifying the output obtained from the linear transformation using at least one of a language classifier, an emotion classifier, and an accent classifier.

2. The system of claim 1, wherein the memory comprises processor-executable instructions, which on execution, further cause the processor to determine the response information by:

determining whether the similarity parameter is greater than a predefined threshold;

in response to a positive determination, determining the response information from the knowledge database using a fine tuning neural network machine learning model; and in response to a negative determination, determining the response information from the knowledge database using a neural network machine learning model.

3. The system of claim 1, wherein the similarity parameter corresponds to a semantic relevance of the context and the input based on the selected embeddings.

4. The system of claim 1, wherein the memory comprises processor-executable instructions, which on execution, cause the processor to generate the set of attributes by:

accessing a persona profile associated with the selected persona from the repository; and retrieving information corresponding to the set of attributes from the repository based on the persona profile.

5. The system of claim 4, wherein the repository comprises a first repository and a second repository, and wherein the memory comprises processor-executable instructions, which on execution, cause the processor to retrieve the information corresponding to the audio attribute from the first repository and the visual attribute from the second repository based on the persona profile.

6. The system of claim 5, wherein the information corresponding to the audio attribute comprises at least one of: voice tone features, emotion features, accent features, and language features.

7. The system of claim 5, wherein the information corresponding to the visual attribute comprises at least one of: facial expressions, gestures, volumetric data, and body movements.

8. The system of claim 1, wherein the memory comprises processor-executable instructions, which on execution, further cause the processor to:

validate the personalized response to determine if a correct set of attributes are shared in the personalized response; and modify the set of attributes in the repository based on the validation.

9. The system of claim 1, wherein the memory comprises processor-executable instructions, which on execution, further cause the processor to:

capture information with respect to visual data and audio data of the user based on the recorded behavior;

determine the plurality of personas based on tagging the information with a respective persona; and store the plurality of personas in the repository.

10. The system of claim 9, wherein the memory comprises processor-executable instructions, which on execution, cause the processor to capture the information with respect to the visual data by performing at least one of: volumetric data capture, coordinate tagging, data persistence, and movement validation with respect to the user.

11. The system of claim 9, wherein the memory comprises processor-executable instructions, which on execution, cause the processor to convert the audio data into embeddings, and wherein the embeddings are stored in the repository.

12. The system of claim 1, wherein the digital platform is one of: a messaging service, an application, or an artificial intelligent user assistance platform.

13. The system of claim 1, wherein the set of parameters further comprise at least a level of emotion and one or more safety constraints.

14. The system of claim 1, wherein the memory comprises processor-executable instructions, which on execution, further cause the processor to:

analyse the audio data by:

performing the normalization on the output of the encoder, wherein the normalization includes performing a mean or a standard deviation of the internal state vectors from the encoder.

15. A method, comprising:

receiving, by a processor, from a user interacting with a system via a digital platform, a selection of a persona, for a digital human, from a plurality of personas;

receiving, by the processor, in real-time, an input from the user via the digital platform;

identifying, by the processor, a set of parameters associated with the input, wherein the set of parameters comprise at least a context of the input;

determining, by the processor from a knowledge database, a response information based on the context of the input, wherein determining the response information from the knowledge database includes:

generating embeddings associated with the input based on a multi-task model, wherein generating embeddings includes:

processing and analyzing audio data of the input by performing speech to text conversion, tone detection, language detection, accent detection, and emotion detection, and converting the audio data into the generated embeddings based on the processing and anal y zing;

selecting embeddings from the knowledge database based on the generated embeddings associated with the input; and determining a similarity parameter based on a comparison of the generated embeddings and the selected embeddings;

generating, by the processor using a repository, a set of attributes for the response information based at least on the set of parameters associated with the input and the persona selected by the user, wherein the set of attributes correspond to at least an audio attribute and a visual attribute;

aggregating, by the processor, the set of attributes and the response information to generate a personalized response to the input; and rendering, by the processor, the personalized response through the digital human on the digital platform, wherein the method further comprising:

analyzing the audio data by:

recording behavior of the user reading a pre-defined script in a controlled environment;

extracting features from the audio data using a mel-frequency cepstral coefficients (MFCC) technique;

encoding and decoding the extracted features using an encoder-decoder long short-term memory (LSTM), wherein an encoder of the LSTM reads the extracted features and outputs summarized information as internal state vectors, and a decoder of the LSTM generates an output sequence which is initialized from final states of the encoder;

applying a connectionist temporal classification (CTC) to the output of the encoder to calculate a loss function associated with the audio data;

performing a normalization on the output obtained from the encoder.

16. The method of claim 15, wherein generating, by the processor, the set of attributes comprises:

accessing, by the processor, a persona profile associated with the selected persona from the repository; and retrieving, by the processor, information corresponding to the set of attributes from the repository based on the persona profile.

17. The method of claim 16, wherein the repository comprises a first repository and a second repository, and wherein the retrieving comprises retrieving, by the processor, the information corresponding to the audio attribute from the first repository and the visual attribute from the second repository based on the persona profile.

18. The method of claim 15, wherein analyzing the audio data includes:

performing the normalization on the output of the encoder, wherein the normalization includes performing a mean or a standard deviation of the internal state vectors from the encoder.

19. A non-transitory computer-readable medium comprising machine-readable instructions that are executable by a processor to:

receive, from a user via a digital platform, a selection of a persona, for a digital human, from a plurality of personas;

receive, in real-time, an input from the user via the digital platform;

identify a set of parameters associated with the input, wherein the set of parameters comprise at least a context of the input;

determine, from a knowledge database, a response information based on the context of the input, wherein determining the response information from the knowledge database includes:

generating embeddings associated with the input based on a multi-task model, wherein generating embeddings includes:

processing and analyzing audio data of the input by performing speech to text conversion, tone detection, language detection, accent detection, and emotion detection, and converting the audio data into the generated embeddings based on the processing and analyzing;

selecting embeddings from the knowledge database based on the generated embeddings associated with the input; and determining a similarity parameter based on a comparison of the generated embeddings and the selected embeddings;

generate, using a repository, a set of attributes for the response information based at least on the set of parameters associated with the input and the persona selected by the user, wherein the set of attributes correspond to at least an audio attribute and a visual attribute;

aggregate the set of attributes and the response information to generate a personalized response to the input; and render the personalized response by the digital human on the digital platform, wherein the machine-readable instructions further cause the processor to:

analyze the audio data by:

recording behavior of the user reading a pre-defined script in a controlled environment;

extracting features from the audio data using a mel-frequency cepstral coefficients (MFCC) technique;

encoding and decoding the extracted features using an encoder-decoder long short-term memory (LSTM), wherein an encoder of the LSTM reads the extracted features and outputs summarized information as internal state vectors, and a decoder of the LSTM generates an output sequence which is initialized from final states of the encoder;

applying a connectionist temporal classification (CTC) to the output of the encoder to calculate a loss function associated with the audio data;

performing a normalization on the output obtained from the encoder.

20. The non-transitory computer-readable medium of claim 19, wherein the machine-readable instructions further cause the processor to:

analyze the audio data by:

performing the normalization on the output of the encoder, wherein the normalization includes performing a mean or a standard deviation of the internal state vectors from the encoder.

* * * * *